(12) United States Patent
Honda

(10) Patent No.: US 11,681,079 B2
(45) Date of Patent: Jun. 20, 2023

(54) SURFACE TREATMENT COMPOSITION

(71) Applicant: DAIKIN INDUSTRIES, LTD., Osaka (JP)

(72) Inventor: Yoshiaki Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 354 days.

(21) Appl. No.: 16/757,456

(22) PCT Filed: Oct. 30, 2018

(86) PCT No.: PCT/JP2018/040363
§ 371 (c)(1),
(2) Date: Apr. 20, 2020

(87) PCT Pub. No.: WO2019/088116
PCT Pub. Date: May 9, 2019

(65) Prior Publication Data
US 2021/0199857 A1 Jul. 1, 2021

(30) Foreign Application Priority Data
Oct. 31, 2017 (JP) .............................. JP2017-211196

(51) Int. Cl.
| | | |
|---|---|---|
| *G02B 1/18* | (2015.01) | |
| *C09D 5/16* | (2006.01) | |
| *C09D 183/04* | (2006.01) | |
| *C09D 183/08* | (2006.01) | |
| *C09D 171/00* | (2006.01) | |
| *C08L 71/02* | (2006.01) | |
| *C03C 17/30* | (2006.01) | |
| *C08G 65/00* | (2006.01) | |
| *C08G 65/336* | (2006.01) | |
| *C09D 7/20* | (2018.01) | |
| *C09K 3/18* | (2006.01) | |

(52) U.S. Cl.
CPC .................. *G02B 1/18* (2015.01); *C09D 5/16* (2013.01); *C09D 5/1675* (2013.01); *C09D 183/04* (2013.01); *C09D 183/08* (2013.01)

(58) Field of Classification Search
None
See application file for complete search history.

(56) References Cited

U.S. PATENT DOCUMENTS

| 10,870,729 | B2 | 12/2020 | Ishii et al. |
| 2013/0216820 | A1 | 8/2013 | Riddle et al. |
| 2017/0342210 | A1 | 11/2017 | Mitsuhashi et al. |
| 2018/0326701 | A1 | 11/2018 | Honda et al. |
| 2019/0031828 | A1 | 1/2019 | Ishii et al. |

FOREIGN PATENT DOCUMENTS

| CN | 105400423 A | 3/2016 |
| CN | 106680905 A | 5/2017 |
| EP | 2 130 850 A1 | 12/2009 |
| JP | 07-053919 A | 2/1995 |
| JP | 2009-173787 A | 8/2009 |
| JP | 2009-175500 A | 8/2009 |
| JP | 2013-244470 A | 12/2013 |
| JP | 2014-503380 A | 2/2014 |
| JP | 2015-214664 A | 12/2015 |
| JP | 2016-138240 A | 8/2016 |
| WO | 2017/094371 A1 | 6/2017 |
| WO | 2017/130973 A1 | 8/2017 |

OTHER PUBLICATIONS

Machine translation of JP 2013-244470 A (Year: 2013).*
International Search Report for PCT/JP2018/040363 dated Jan. 29, 2019 [PCT/ISA/210].
International Preliminary Report on Patentability with a Translation of Written Opinion in International Application No. PCT/JP2018/040363, dated May 5, 2020.
Communication dated Jul. 7, 2021, from the European Patent Office in application No. 18872511.3.

* cited by examiner

*Primary Examiner* — Ramsey Zacharia
(74) *Attorney, Agent, or Firm* — Sughrue Mion, PLLC

(57) ABSTRACT

A surface treatment composition including a perfluoropolyether group-containing silane compound and a solvent, wherein a proportion of the perfluoropolyether group-containing silane compound based on a total amount of the perfluoropolyether group-containing silane compound and the solvent is in the range from 30 to 99% by mass.

11 Claims, No Drawings

SURFACE TREATMENT COMPOSITION

CROSS REFERENCE TO RELATED APPLICATIONS

This application is a National Stage of International Application No. PCT/JP2018/040363 filed Oct. 30, 2018, claiming priority based on Japanese Patent Application No. 2017-211196 filed Oct. 31, 2017.

TECHNICAL FIELD

The present invention relates to a surface treatment composition.

BACKGROUND ART

It is known that a certain fluorine-containing silane compound can provide excellent water-repellency, oil-repellency, antifouling property, and the like when used for a surface treatment of a base material. For example, Patent Literature 1 describes a surface treatment composition including a perfluoropolyether group-containing silane compound having a perfluoropolyether group in a molecular backbone and a hydrolyzable group bonding to a Si atom at a molecular end or an end portion.

CITATION LIST

Patent Literature

Patent Literature 1: JP 2016-138240 A

SUMMARY OF INVENTION

Technical Problem

A layer obtained from such a surface treatment composition (hereinafter, sometimes referred to as "surface-treating layer") is demanded to not only have favorable surface physical properties, but also be less in variation in such surface physical properties.

An object of the present invention is to provide a surface-treating layer which is less in variation in surface physical properties (for example, friction durability).

Solution to Problem

A perfluoropolyether group-containing silane compound may be used as a composition including a perfluoropolyether group-containing silane compound and a solvent from the viewpoint that favorable handleability is demanded. For example, Examples of Patent Literature 1 describe a surface treatment composition including a perfluoropolyether group-containing silane compound (hereinafter, sometimes referred to as "PFPE-containing silane compound") and a solvent, the composition including 20 parts by mass of the PFPE-containing silane compound based on 100 parts by mass of the surface treatment composition.

The present inventor, however, has made studies and has found that a layer obtained from the surface treatment composition including 20 parts by mass of the PFPE group-containing silane compound and a solvent is varied in surface physical properties.

A first aspect of the present invention provides
a surface treatment composition including a perfluoropolyether group-containing silane compound and a solvent, wherein
a proportion of the perfluoropolyether group-containing silane compound based on 100 parts by mass of a total amount of the perfluoropolyether group-containing silane compound and the solvent is in the range from 30 to 99 parts by mass.

A second aspect of the present invention provides a pellet containing the surface treatment composition of the present invention.

A third aspect of the present invention provides an article including a base material, and a layer formed from the surface treatment composition of the present invention, on a surface of the base material.

Advantageous Effects of Invention

The present invention can provide a surface treatment composition that can contribute to formation of a surface-treating layer which is less in variation in surface physical properties (for example, friction durability).

DESCRIPTION OF EMBODIMENTS

Hereinafter, the surface treatment composition of the present invention will be described.

The surface treatment composition of the present invention includes
a perfluoropolyether group-containing silane compound and a solvent, wherein
the proportion of the perfluoropolyether group-containing silane compound based on 100 parts by mass of the total amount of the perfluoropolyether group-containing silane compound and the solvent is in the range from 30 to 99 parts by mass.

(PFPE-Containing Silane Compound)

The PFPE-containing silane compound is not limited as long as the compound mainly has a fluorine-containing moiety imparting water-repellency, surface lubricity, and the like, and a silane moiety imparting a binding ability to other substance. Herein, the perfluoropolyether group (hereinafter, also referred to as "PFPE") means a group where all hydrogen atoms of a polyether group are each substituted with a fluorine atom.

In one embodiment, the PFPE-containing silane compound is a compound represented by (A1), (A2), (B1), (B2), (C1), (C2), (D1) or (D2).

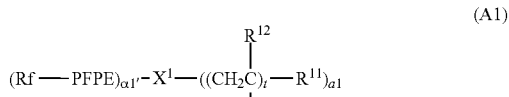

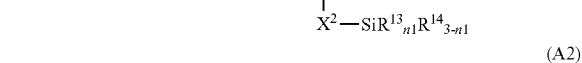

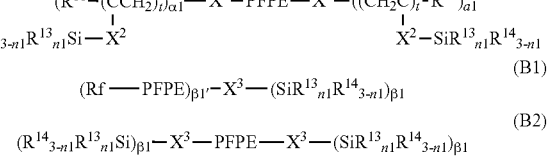

-continued

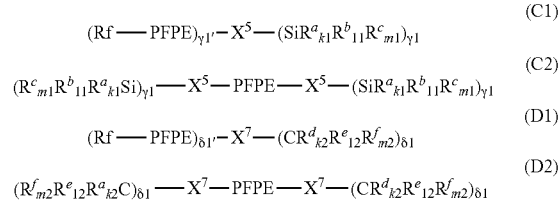

Hereinafter, any PFPE-containing silane compound represented by the formulae (A1), (A2), (B1), (B2), (C1), (C2), (D1) and (D2) will be described.

The "di- to decavalent organic group", as used herein, means a di- to decavalent group containing carbon. The di- to decavalent organic group is not limited, and examples thereof include a di- to decavalent group where 1 to 9 hydrogen atoms are further removed from a hydrocarbon group. The divalent organic group is not limited, and examples thereof include a divalent group where one hydrogen atom is further removed from a hydrocarbon group.

The "hydrocarbon group", as used herein, means a group which contains carbon and hydrogen and which is obtained by removing one hydrogen atom from a molecule. The hydrocarbon group is not limited, and examples thereof include a hydrocarbon group having 1 to 20 carbon atoms, optionally substituted with one or more substituents, such as an aliphatic hydrocarbon group and an aromatic hydrocarbon group. For example, the "aliphatic hydrocarbon group" may be any linear, branched or cyclic group, and may be any saturated or unsaturated group. For example, the hydrocarbon group may contain one or more ring structures. The hydrocarbon group may have one or more N, O, S, Si, amide, sulfonyl, siloxane, carbonyl, carbonyloxy, and the like at an end thereof or in a molecular chain thereof.

Each substituent of the "hydrocarbon group", as used herein, is not limited, and examples thereof include a halogen atom; and one or more groups selected from a $C_{1-6}$ alkyl group, a $C_{2-6}$ alkenyl group, a $C_{2-6}$ alkynyl group, a C3-10 cycloalkyl group, a C3-10 unsaturated cycloalkyl group, a 5 to 10-membered heterocyclyl group, a 5 to 10-membered unsaturated heterocyclyl group, a $C_{6-10}$ aryl group and a 5 to 10-membered heteroaryl group each optionally substituted with one or more halogen atoms.

The alkyl group and the phenyl group may be herein unsubstituted or substituted, unless particularly noted. Each substituent of such groups is not limited, and examples thereof include one or more groups selected from a halogen atom, a $C_{1-6}$ alkyl group, a $C_{2-6}$ alkenyl group and a $C_{2-6}$ alkynyl group.

Formulae (A1) and (A2):

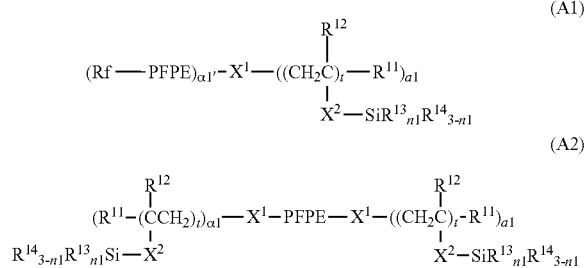

In the formulae, Rf, at each occurrence, independently represents an alkyl group having 1 to 16 carbon atoms, optionally substituted with one or more fluorine atoms.

The "alkyl group having 1 to 16 carbon atoms" with respect to the alkyl group having 1 to 16 carbon atoms, the group being optionally substituted with one or more fluorine atoms, is optionally linear or branched, is preferably a linear or branched alkyl group having 1 to 6 carbon atoms, particularly 1 to 3 carbon atoms, more preferably a linear alkyl group having 1 to 3 carbon atoms.

Rf is preferably an alkyl group having 1 to 16 carbon atoms, the group being optionally substituted with one or more fluorine atoms, more preferably a $CF_2H$—$C_{1-15}$ fluoroalkylene group or a $C_{1-16}$ perfluoroalkyl group, further preferably a $C_{1-16}$ perfluoroalkyl group.

The perfluoroalkyl group having 1 to 16 carbon atoms may be linear or branched, and is preferably a linear or branched perfluoroalkyl group having 1 to 6 carbon atoms, in particular, 1 to 3 carbon atoms, more preferably a linear perfluoroalkyl group having 1 to 3 carbon atoms, specifically —$CF_3$, —$CF_2CF_3$, or —$CF_2CF_2CF_3$.

In the formulae, PFPE, at each occurrence, is independently a group represented by:

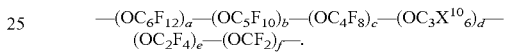

In the formulae, a, b, c, d, e and f are each independently an integer of 0 or more and 200 or less, and the sum of a, b, c, d, e and f is at least 1. Preferably, a, b, c, d, e and f are each independently an integer of 0 or more and 100 or less. Preferably, the sum of a, b, c, d, e and f is 5 or more, more preferably 10 or more. Preferably, the sum of a, b, c, d, e and f is 200 or less, more preferably 100 or less, for example, 10 or more and 200 or less, more specifically 10 or more and 100 or less. The occurrence order of the respective repeating units in parentheses with a, b, c, d, e or f is not limited in the formula. Each $X^{10}$, at each occurrence, independently represents a hydrogen atom, a fluorine atom or a chlorine atom, preferably a hydrogen atom or a fluorine atom, more preferably a fluorine atom.

Such repeating units may, for example, be linear or branched, and are preferably linear. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$—, or the like, and is preferably —$(OCF_2CF_2CF_2CF_2CF_2CF_2)$—. For example, —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, or the like, and is preferably —$(OCF_2CF_2CF_2CF_2CF_2)$—. —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, and is preferably —$(OCF_2CF_2CF_2CF_2)$—. —$(OC_3F_6)$— (namely, in the formulae, $X^{10}$ represents a fluorine atom) may be any of —$(OCF_2CF_2CF_2)$—, —$(OCF(CF_3)CF_2)$— and —$(OCF_2CF(CF_3))$—, and is preferably —$(OCF_2CF_2CF_2)$—. —$(OC_2F_4)$— may be any of —$(OCF_2CF_2)$— and —$(OCF(CF_3))$—, and is preferably —$(OCF_2CF_2)$—.

In one embodiment, PFPE is —$(OC_3F_6)_d$—, wherein d is an integer of 1 or more and 200 or less, preferably 5 or more and 200 or less, more preferably 10 or more and 200 or less.

Preferably, PFPE is —$(OCF_2CF_2CF_2)_d$—, wherein d is an integer of 1 or more and 200 or less, preferably 5 or more and 200 or less, more preferably 10 or more and 200 or less, or —$(OCF(CF_3)CF_2)_d$—, wherein d is an integer of 1 or more and 200 or less, preferably 5 or more and 200 or less, more preferably 10 or more and 200 or less. More preferably, PFPE is —$(OCF_2CF_2CF_2)_d$—, wherein d is an integer of 1 or more and 200 or less, preferably 5 or more and 200 or less, more preferably 10 or more and 200 or less.

In another embodiment, PFPE is —$(OC_4F_8)_c$—$(OC_3F_6)_d$—$(OC_2F_4)_e$—$(OCF_2)_f$—, wherein c and d are each independently an integer of 0 or more and 30 or less, e and f are each independently 1 or more and 200 or less, preferably 5 or more and 200 or less, more preferably an integer of 10 or more and 200 or less, the sum of c, d, e and f is at least 5 or more, preferably 10 or more, and the occurrence order of the respective repeating units in parentheses with the subscript c, d, e or f is not limited in the formulae. Preferably, PFPE is —$(OCF_2CF_2CF_2CF_2)_c$—$(OCF_2CF_2CF_2)_d$—$(OCF_2CF_2)_e$—$(OCF_2)_f$—.

In one embodiment, PFPE may be —$(OC_2F_4)_e$—$(OCF_2)_f$—, wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formulae.

In still another embodiment, PFPE is a group represented by —$(R^6—R^7)_j$—. In the formulae, $R^6$ represents $OCF_2$ or $OC_2F_4$, preferably $OC_2F_4$. In the formula, $R^7$ represents a group selected from $OC_2F_4$, $OC_3F_6$, $OC_4F_8$, $OC_5F_{10}$ and $OC_6F_{12}$, or a combination of two or three groups independently selected from the above groups. Preferably, $R^7$ is a group selected from $OC_2F_4$, $OC_3F_6$ and $OC_4F_8$, or a combination of two or three groups independently selected from such groups, more preferably a group selected from $OC_3F_6$ and $OC_4F_8$. Such a combination of two or three groups independently selected from $OC_2F_4$, $OC_3F_6$ and $OC_4F_8$ is not limited, and examples thereof include —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$-, —$OC_4F_8OC_2F_4$—, —$OC_2F_4OC_2F_4OC_3F_6$-, $OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. Here, j is an integer of 2 or more, preferably 3 or more, more preferably 5 or more, and an integer of 100 or less, preferably 50 or less. In the formulae, $OC_2F_4$, $OC_3F_6$, $OC_4F_8$, $OC_5F_{10}$ and $OC_6F_{12}$ may be linear or branched, and is preferably linear. In this embodiment, PFPE is preferably —$(OC_2F_4—OC_3F_6)_j$— or —$(OC_2F_4—OC_4F_8)_j$—.

The ratio of e to f in PFPE (hereinafter, referred to as "e/f ratio") is 0.1 or more and 10 or less, preferably 0.2 or more and 5.0 or less, more preferably 0.2 or more and 2.0 or less, further preferably 0.2 or more and 1.5 or less. The e/f ratio, which falls within the range, can more enhance water-repellency, oil-repellency and chemical resistance (for example, durability to brine, aqueous acidic or basic solution, acetone, oleic acid or hexane) of a cured product obtained from the compound. A lower e/f ratio more enhances water-repellency, oil-repellency and chemical resistance of the cured product. On the other hand, an e/f ratio of 0.1 or more can more enhance stability of the compound. A higher e/f ratio more enhances stability of the compound.

In the formulae, each $R^{13}$, at each occurrence, independently represents a hydroxyl group or a hydrolyzable group.

The "hydrolyzable group", as used herein, means a group which can undergo a hydrolysis reaction, namely, means a group which can be removed from a main backbone of the compound by a hydrolysis reaction. Examples of the hydrolyzable group include —OR, —OCOR, —O—N=$CR_2$, —$NR_2$, —NHR, and halogen, wherein each R represents a substituted or unsubstituted alkyl group having 1 to 4 carbon atoms, preferably include —OR (namely, alkoxy group). Examples of R include unsubstituted alkyl groups such as a methyl group, an ethyl group, a propyl group, an isopropyl group, a n-butyl group and an isobutyl groups; and saturated alkyl groups such as a chloromethyl group. Among them, an alkyl group, in particular, an unsubstituted alkyl group is preferable, and a methyl group or an ethyl group is more preferable. The hydroxyl group is not limited, and may be generated by hydrolyzing the hydrolyzable group.

In the formulae, each $R^{14}$, at each occurrence, independently represents a hydrogen atom or an alkyl group having 1 to 22 carbon atoms, preferably an alkyl group having 1 to 4 carbon atoms.

In the formulae, each $R^{11}$, at each occurrence, independently represents a hydrogen atom or a halogen atom. The halogen atom is preferably an iodine atom, a chlorine atom or a fluorine atom, more preferably a fluorine atom.

In the formulae, each $R^{12}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, and examples thereof include a methyl group, an ethyl group and a propyl group.

In the formulae, n1 with respect to each (—$SiR^{13}_{n1}R^{14}_{3-n1}$) unit is independently an integer of 0 to 3, preferably 1 to 3, more preferably 3. In the formulae, at least one n1 is an integer of 1 to 3, namely, there is not any case where all n1(s) are simultaneously 0. In other words, at least one $R^{13}$ is present in the formula.

In one embodiment, at least two Si each bonding to the hydroxyl group or the hydrolyzable group are present in formulae (A1) and (A2). That is, at least two —$SiR^{13}_{n1}R^{14}_{3-n1}$ structures (namely, —$SiR^{13}$ moieties) where n is 1 or more are present in formulae (A1) and (A2).

In the formulae, each $X^1$ independently represents a single bond or a di- to decavalent organic group. $X^1$ is understood to be a linker which links a perfluoropolyether moiety (namely, Rf-PFPE moiety or -PFPE-moiety) mainly providing water-repellency, surface lubricity, and the like, and a silane moiety (namely, group in parentheses with α1) mainly providing a binding ability to the base material, in any compound represented by formulae (A1) and (A2). Accordingly, $X^1$ may be a single bond or any organic group as long as such any compound represented by formulae (A1) and (A2) can be stably present. Herein, a left portion and a right portion of the group designated as $X^1$ are bonding to the group represented by PFPE and the group in parentheses with α1, respectively.

In another embodiment, $X^1$ can be $X^e$. $X^e$ represents a single bond or a di- to decavalent organic group, preferably represents a single bond or a di- to decavalent organic group having at least one selected from the group consisting of —$C_6H_4$— (namely, -phenylene-, hereinafter, representing a phenylene group), —CO— (carbonyl group), —$NR^4$— and —$SO_2$—. Each $R^4$ independently represents a hydrogen atom, a phenyl group, or a $C_{1-6}$ alkyl group (preferably a methyl group), preferably represents a hydrogen atom or a methyl group. Such —$C_6H_4$—, —CO—, —$NR^4$— or —$SO_2$— is preferably contained in a molecular backbone of the PFPE-containing silane compound.

The molecular backbone here represents a relatively longest binding chain in a molecule of the PFPE-containing silane compound.

$X^e$ more preferably represents a single bond or a di- to decavalent organic group having at least one selected from the group consisting of —$C_6H_4$—, —$CONR^4$—, —$CONR^4$—$C_6H_4$—, —CO—, —CO—$C_6H_4$—, —$SO_2NR^4$—, —$SO_2NR^4$—$C_6H_4$—, —$SO_2$—, and —$SO_2$—$C_6H_4$—. Such —$C_6H_4$—, —$CONR^4$—, —$CONR^4$—$C_6H_4$—, —CO—, —CO—$C_6H_4$—, —$SO_2NR^4$—, —$SO_2NR^4$—$C_6H_4$—, —$SO_2$—, or —$SO_2$—$C_6H_4$— is preferably contained in a molecular backbone of the PFPE-containing silane compound.

In the formulae, α1 is an integer of 1 to 9 and α1' is an integer of 1 to 9. Such α1 and α1' may be varied depending on the valence of $X^1$. In formula (A1), the sum of α1 and α1' is the same as the valence of $X^1$. For example, in the case where $X^1$ is a decavalent organic group, the sum of α1 and α1' can be 10, for example, α1 can be 9 and α1' can be 1, α1 can be 5 and α1' can be 5, or α1 can be 1 and α1' can be 9. In the case where $X^1$ is a divalent organic group, α1 and α1' are 1. In formula (A2), α1 corresponds to a value obtained by subtracting 1 from the valence of $X^1$. In the case where $X^1$ is a single bond, α1 or α1' is 1.

$X^1$ is preferably a di- to heptavalent, more preferably di- to tetravalent, further preferably divalent organic group.

In one embodiment, $X^1$ is a di- to tetravalent organic group, α1 is 1 to 3, and α1' is 1.

In another embodiment, $X^1$ is a divalent organic group, α1 is 1, and α1' is 1. In such a case, formulae (A1) and (A2) are represented by the following formulae (A1') and (A2'), respectively.

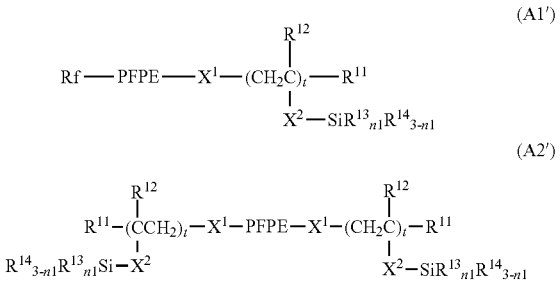

Examples of $X^1$ are not limited, and include a divalent group represented by the following formula:

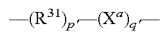

wherein:

$R^{31}$ represents a single bond, —$(CH_2)_{s'}$—, or an o-, m- or p-phenylene group, preferably represents —$(CH_2)_{s'}$—, s' is an integer of 1 to 20, preferably an integer of 1 to 6, more preferably an integer of 1 to 3, still more preferably 1 or 2, $X^a$ represents, —$(X^b)_{l'}$—, each $X^b$, at each occurrence, independently represents a group selected from the group consisting of —O—, —S—, o-, m- or p-phenylene group, —C(O)O—, —$Si(R^{33})_2$—, —$(Si(R^{33})_2O)_{m'}$—$Si(R^{33})_2$—, —$CONR^{34}$—, —O—$CONR^{34}$—, —$NR^{34}$— and —$(CH_2)_{n'}$—, each $R^{33}$, at each occurrence, independently represents a phenyl group, a $C_{1-6}$ alkyl group or a $C_{1-6}$ alkoxy group, preferably represents a phenyl group or a $C_{1-6}$ alkyl group, more preferably represents a methyl group, each $R^{34}$, at each occurrence, independently represents a hydrogen atom, a phenyl group, or a $C_{1-6}$ alkyl group (preferably a methyl group), each m', at each occurrence, is independently an integer of 1 to 100, preferably an integer of 1 to 20, each n', at each occurrence, is independently an integer of 1 to 20, preferably an integer of 1 to 6, more preferably an integer of 1 to 3, l' is an integer of 1 to 10, preferably an integer of 1 to 5, more preferably an integer of 1 to 3, p' is 0 or 1, and q' is 0 or 1, provided that at least one of p' and q' is 1, and the occurrence order of the respective repeating units in parentheses with p' or q' is not limited. Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

In one embodiment, l' is 1.

Preferably, $X^1$ is —$(R^{31})_{p'}$—$(X^a)_{q'}$—$R^{32}$—. $R^{32}$ represents a single bond, —$(CH_2)_{t'}$—, or an o-, m- or p-phenylene group, preferably —$(CH_2)_{t'}$—. Here, t' is an integer of 1 to 20, preferably an integer of 2 to 6, more preferably an integer of 2 to 3. Here, $R^{32}$ (typically, any hydrogen atom in $R^{32}$) is optionally substituted with one or more substituents selected from a fluorine atom, a $C_{1-3}$ alkyl group and a $C_{1-3}$ fluoroalkyl group.

Preferably, $X^1$ can be a single bond, a $C_{1-20}$ alkylene group,

—$R^{31}$—$X^c$—$R^{32}$—, or

—$X^d$—$R^{32}$— wherein $R^{31}$ and $R^{32}$ have the same meanings as described above. Herein, such an alkylene group is a group having a —$(C_\delta H_{2\delta})$— structure, and is optionally substituted or unsubstituted and is optionally linear or branched.

More preferably, $X^1$ is a single bond, a $C_{1-20}$ alkylene group,

—$(CH_2)_{s'}$—$X^c$—,

—$(CH_2)_{s'}$—$X^c$—$(CH_2)_{t'}$—

—$X^d$—, or

—$X^d$—$(CH_2)_{t'}$— wherein s' and t' have the same meanings as described above.

Further preferably, $X^1$ is

—$X^f$—, a —$X^f$—$C_{1-20}$ alkylene group,

—$X^f$—$(CH_2)_{s'}$—$X^c$—,

—$X^f$—$(CH_2)_{s'}$—$X^c$—$(CH_2)_{t'}$—

—$X^f$—$X^d$—, or

—$X^f$—$X^d$—$(CH_2)_{t'}$— wherein s' and t' have the same meanings as described above.

In the formulae, $X^f$ is an alkylene group having 1 to 6 carbon atoms, preferably 1 to 4 carbon atoms, more preferably 1 to 2 carbon atoms, for example, a methylene group. Any hydrogen atom in $X^f$ is optionally substituted with one or more substituents selected from a fluorine atom, a $C_{1-3}$ alkyl group and a $C_{1-3}$ fluoroalkyl group, and is preferably substituted. $X^f$ may be linear or branched, and is preferably linear.

In the formulae, $X^c$ represents

—O—,

—S—,

—C(O)O—,

—CONR$^{34}$—,
—O—CONR$^{34}$—,
—Si(R$^{33}$)$_2$—,
—(Si(R$^{33}$)$_2$O)$_{m'}$—Si(R$^{33}$)$_2$—,
—O—(CH$_2$)$_{u'}$—(Si(R$^{33}$)$_2$O)$_{m'}$—Si(R$^{33}$)$_2$—,
—O—(CH$_2$)$_{u'}$—Si(R$^{33}$)$_2$—O—Si(R$^{33}$)$_2$—CH$_2$CH$_2$—Si(R$^{33}$)$_2$—O—Si(R$^{33}$)$_2$—,
—O—(CH$_2$)$_{u'}$—Si(OCH$_3$)$_2$OSi(OCH$_3$)$_2$—,
—CONR$^{34}$—(CH$_2$)$_{u'}$—(Si(R$^{33}$)$_2$O)$_{m'}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein R$^{33}$, R$^{34}$ and m' have the same meanings as described above, and u' is an integer of 1 to 20, preferably an integer of 2 to 6, more preferably an integer of 2 to 3. X$^c$ is preferably —O—.

In the formulae, X$^d$ represents
—S—,
—C(O)O—,
—CONR$^{34}$—,
—CONR$^{34}$—(CH$_2$)$_{u'}$—(Si(R$^{33}$)$_2$O)$_{m'}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein each symbol has the same meaning as described above.

Particularly preferably, X$^1$ is a group represented by
—X$^f$—,
a —X$^f$—C$_{1-20}$ alkylene group,
—X$^f$—(CH$_2$)$_{s'}$—X$^c$—,
—X$^f$—(CH$_2$)$_{s'}$—X$^c$—(CH$_2$)$_{t'}$—
—X$^f$—X$^d$—, or
—X$^f$—X$^d$—(CH$_2$)$_{t'}$—
wherein X$^f$, s' and t' have the same meanings as described above;

X$^c$ represents —O—, or —CONR$^{34}$—,
X$^d$ represents —CONR$^{34}$—, and
each R$^{34}$, at each occurrence, independently represents a hydrogen atom, a phenyl group, or a C$_{1-6}$ alkyl group (preferably a methyl group).

In one embodiment, X$^1$ is a group represented by
—X$^f$—(CH$_2$)$_{s'}$—X$^c$—,
—X$^f$—(CH$_2$)$_{s'}$—X$^c$—(CH$_2$)$_{t'}$—
—X$^f$—X$^d$—, or
—X$^f$—X$^d$—(CH$_2$)$_{t'}$—
wherein X$^f$, s' and t' have the same meanings as described above;

X$^c$ represents —CONR$^{34}$—,
X$^d$ represents —CONR$^{34}$—, and
each R$^{34}$, at each occurrence, independently represents a hydrogen atom, a phenyl group or a C$_{1-6}$ alkyl group (preferably a methyl group).

In one embodiment, X$^1$ can be,
a single bond,
a C$_{1-20}$ alkylene group,
—(CH$_2$)$_{s'}$—X$^c$—(CH$_2$)$_{t'}$—, or
—X$^d$—(CH$_2$)$_{t'}$—
wherein each symbol has the same meaning as described above.

Preferably, X$^1$ is
a single bond,
a C$_{1-20}$ alkylene group,
—(CH$_2$)$_{s'}$—O—(CH$_2$)$_{t'}$—,
—(CH$_2$)$_{s'}$—(Si(R$^{33}$)$_2$O)$_{m'}$—Si(R$^{33}$)$_2$—(CH$_2$)$_{t'}$—,
—(CH$_2$)$_{s'}$—O—(CH$_2$)$_{u'}$—(Si(R$^{33}$)$_2$O)$_{m'}$—Si(R$^{33}$)$_2$—(CH$_2$)$_{t'}$—, or
—(CH$_2$)$_{s'}$—O—(CH$_2$)$_{t'}$—Si(R$^{33}$)$_2$—(CH$_2$)$_{u'}$—Si(R$^{33}$)$_2$—(C$_v$H$_{2v}$)— wherein R$^{33}$, m', s', t' and u' have the same meanings as described above, and v is an integer of 1 to 20, preferably an integer of 2 to 6, more preferably an integer of 2 to 3.

In the formulae, —(C$_v$H$_{2v}$)— is optionally linear or branched, and can be, for example, —CH$_2$—, —CH$_2$CH$_2$—, —CH$_2$CH$_2$CH$_2$—, —CH(CH$_3$)— or —CH(CH$_3$)CH$_2$—.

The X$^1$ group is optionally substituted with one or more substituents selected from a fluorine atom, a C$_{1-3}$ alkyl group and a C$_{1-3}$ fluoroalkyl group (preferably C$_{1-3}$perfluoroalkyl group).

In one embodiment, the X$^1$ group can be other than a —O—C$_{1-6}$ alkylene group.

In another embodiment, examples of the X$^1$ group include the following groups:

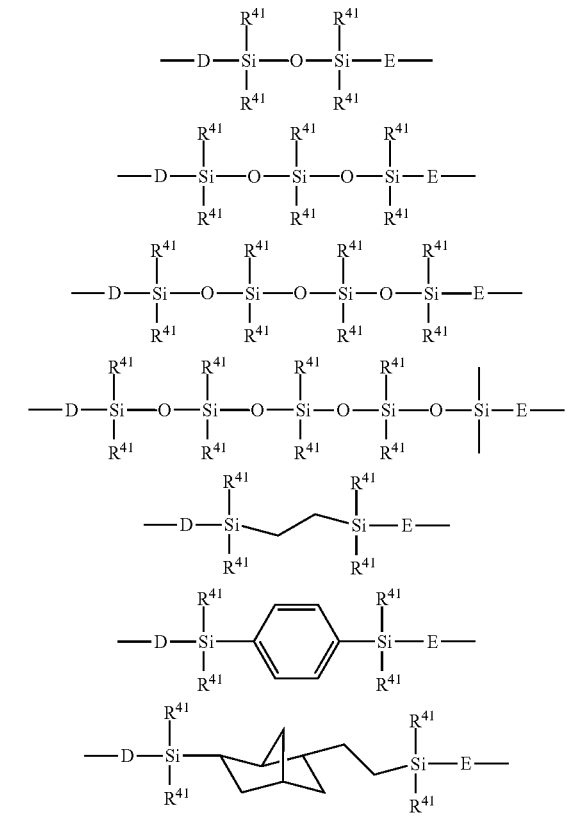

wherein each R$^{41}$ independently represents a hydrogen atom, a phenyl group, an alkyl group having 1 to 6 carbon atoms, or a C$_{1-6}$ alkoxy group, preferably a methyl group;

D is a group selected from
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$—, wherein Ph means phenyl; and

[Structure: acetyl-N(R42)-phenyl(-SiR42R42-CH2CH2-)]

wherein each $R^{42}$ independently represents a hydrogen atom, a $C_{1-6}$ alkyl group or a $C_{1-6}$ alkoxy group, preferably a methyl group or a methoxy group, more preferably a methyl group;

E is $-(CH_2)_{ne}-$ (ne is an integer of 2 to 6),

D is bonding to PFPE of a molecular backbone, and E is bonding to a group opposite to PFPE.

Specific examples of $X^1$ include:
a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—CONH—,
—CONH—$CH_2$—,
—CONH—$(CH_2)_2$—,
—CONH—$(CH_2)_3$—,
—CONH—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CON(CH_3)$—$(CH_2)_3$—,
—$CON(Ph)$-$(CH_2)_3$—, wherein Ph means phenyl,
—$CON(CH_3)$—$(CH_2)_6$—,
—$CON(Ph)$-$(CH_2)_6$—, wherein Ph means phenyl,
—$CF_2$—$CON(CH_3)$—$(CH_2)_3$—,
—$CF_2$—$CON(Ph)$—$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—CONH—$(CH_2)_3Si(CH_3)_2OSi(CH_3)_2(CH_2)_2$—,
—CONH—$(CH_2)_3Si(CH_3)_2OSi(CH_3)_2OSi(CH_3)_2(CH_2)_2$—,
—CONH—$(CH_2)_3Si(CH_3)_2O(Si(CH_3)_2O)_2Si(CH_3)_2(CH_2)_2$—,
—CONH—$(CH_2)_3Si(CH_3)_2O(Si(CH_3)_2O)_3Si(CH_3)_2(CH_2)_2$—,
—CONH—$(CH_2)_3Si(CH_3)_2O(Si(CH_3)_2O)_{10}Si(CH_3)_2(CH_2)_2$—,
—CONH—$(CH_2)_3Si(CH_3)_2O(Si(CH_3)_2O)_{20}Si(CH_3)_2(CH_2)_2$—,
—C(O)O—$(CH_2)_3$—,
—C(O)O—$(CH_2)_6$—,
—$CH_2$—O—$(CH_2)_3$—$Si(CH_3)_2$—$(CH_2)_2$—$Si(CH_3)_2$—$(CH_2)_2$—,
—$CH_2$—O—$(CH_2)_3$—$Si(CH_3)_2$—$(CH_2)_2$—$Si(CH_3)_2$—$CH(CH_3)$—,
—$CH_2$—O—$(CH_2)_3$—$Si(CH_3)_2$—$(CH_2)_2$—$Si(CH_3)_2$—$(CH_2)_3$—,
—$CH_2$—O—$(CH_2)_3$—$Si(CH_3)_2$—$(CH_2)_2$—$Si(CH_3)_2$—$CH(CH_3)$—$CH_2$—,
—$OCH_2$—,
—$O(CH_2)_3$—,
—$OCFHCF_2$—

[Structure: acetyl-N(Me)-phenyl(-Si(Me)(Me)-CH2CH2-)]

-continued

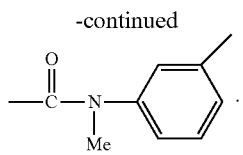

In particular, $X^1$ is preferably
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2$—$C(O)NH$—$CH_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONH$CH_2$—,
—$CF_2$CONH$(CH_2)_2$—,
—$CF_2$CONH$(CH_2)_3$—,
—$CF_2$CONH$(CH_2)_e$—,
—$CON(CH_3)$—$(CH_2)_3$—,
—CON(Ph)-$(CH_2)_3$—, wherein Ph means phenyl,
—$CON(CH_3)$—$(CH_2)_6$—,
—CON(Ph)-$(CH_2)_6$—, wherein Ph means phenyl,
—$CF_2$—$CON(CH_3)$—$(CH_2)_3$—,
—$CF_2$—CON(Ph)-$(CH_2)_3$—, wherein Ph means phenyl,
—$CF_2$—$CON(CH_3)$—$(CH_2)_6$—,
—$CF_2$—CON(Ph)-$(CH_2)_6$—, wherein Ph means phenyl,
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—$OCH_2$—,
—$O(CH_2)_3$—,
—$OCFHCF_2$—.

In particular, $X^1$ is more preferably
—$CH_2OCF_2CHFOCF_2CF_2CF_2$—$C(O)NH$—$CH_2$—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONH$CH_2$—,
—$CF_2$CONH$(CH_2)_2$—,
—$CF_2$CONH$(CH_2)_3$—,
—$CF_2$CONH$(CH_2)_6$—,
—$CON(CH_3)$—$(CH_2)_3$—,
—CON(Ph)-$(CH_2)_3$—, wherein Ph means phenyl,
—$CON(CH_3)$—$(CH_2)_6$—,
—CON(Ph)-$(CH_2)_6$—, wherein Ph means phenyl,
—$CF_2$—$CON(CH_3)$—$(CH_2)_3$—,
—$CF_2$—CON(Ph)-$(CH_2)_3$—, wherein Ph means phenyl,
—$CF_2$—$CON(CH_3)$—$(CH_2)_6$—,
—$CF_2$—CON(Ph)-$(CH_2)_6$—, wherein Ph means phenyl,
—CONH—$(CH_2)_2NH(CH_2)_3$—,
—CONH—$(CH_2)_6NH(CH_2)_3$—.

In one embodiment, $X^1$ represents $X^{e'}$. $X^{e'}$ is a single bond, an alkylene group having 1 to 6 carbon atoms, —$R^{51}$—$C_6H_4$—$R^{52}$—, —$R^{51}$—$CONR^4$—$R^{52}$—, —$R^{51}$—$CONR^4$—$C_6H_4$—$R^{52}$—, —$R^{51}$—CO—$R^{52}$—, —$R^{51}$—CO—$C_6H_4$—$R^{52}$—, —$R^{51}$—$SO_2NR^4$—$R^{52}$—, —$R^{51}$—$SO_2NR^4$—$C_6H_4$—$R^{52}$—, —$R^{51}$—$SO_2$—$R^{52}$—, or —$R^{51}$—$SO_2$—$C_6H_4$—$R^{52}$—. $R^{51}$ and $R^{52}$ each independently represent a single bond or an alkylene group having 1 to 6 carbon atoms, preferably a single bond or an alkylene group having 1 to 3 carbon atoms. $R^4$ has the same meaning as described above. The alkylene group is substituted or unsubstituted, preferably unsubstituted. Examples of the substituent of the alkylene group can include a halogen atom, preferably a fluorine atom. The alkylene group is linear or branched, preferably linear.

In a preferable embodiment, $X^{e'}$ can be
a single bond,
—$X^t$—,
an alkylene group having 1 to 6 carbon atoms, preferably 1 to 3 carbon atoms
a —$X^f$—$C_{1-6}$ alkylene group, preferably a —$X^f$—$C_{1-3}$ alkylene group, more preferably
a —$X^f$—$C_{1-2}$ alkylene group,
—$C_6H_4$—$R^{52'}$—,
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—CO—$R^{52'}$—,
—CO—$C_6H_4$—$R^{52'}$—,
—$SO_2NR^{4'}$—$R^{52'}$—,
—$SO_2NR^{4'}$—$C_6H_4$—$R^{52'}$—,
—$SO_2$—$R^{52'}$—,
—$SO_2$—$C_6H_4$—$R^{52'}$—,
—$R^{51'}$—$C_6H_4$—,
—$R^{51'}$—$CONR^{4'}$—,
—$R^{51'}$—$CONR^{4'}$—$C_6H_4$—,
—$R^{51'}$—CO—,
—$R^{51'}$—CO—$C_6H_4$—,
—$R^{51'}$—$SO_2NR^{4'}$—, —$R^{51'}$—$SO_2NR^{4'}$—$C_6H_4$—,
—$R^{51'}$—$SO_2$—,
—$R^{51'}$—$SO_2$—$C_6H_4$—,
—$C_6H_4$—,
—$CONR^{4'}$—,
—$CONR^{4'}$—$C_6H_4$—,
—$X^f$—$CONR^{4'}$—,
—$X^f$—$CONR^{4'}$—$C_6H_4$—,
—CO—,
—CO—$C_6H_4$—,
—$SO_2NR^{4'}$—,
—$SO_2NR^{4'}$—$C_6H_4$—
—$SO_2$—, or
—$SO_2$—$C_6H_4$—
wherein $R^{51'}$ and $R^{52'}$ each independently represent a linear alkylene group having 1 to 6 carbon atoms, preferably 1 to 3 carbon atoms, the alkylene group is substituted or unsubstituted, as described above, and examples of the substituent of the alkylene group can include a halogen atom, preferably a fluorine atom, and $R^{4'}$ is a hydrogen atom or a methyl group.

In particular, $X^{e'}$ can be preferably
—$X^f$—,
an alkylene group having 1 to 6 carbon atoms, preferably 1 to 3 carbon atoms,
a —$X^f$—$C_{1-6}$ alkylene group, preferably a —$X^f$—$C_{1-3}$ alkylene group, more preferably
a —$X^f$—$C_{1-2}$ alkylene group,
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$CONR^{4'}$—,
—$CONR^{4'}$—$C_6H_4$—,
—$X^f$—$CONR^{4'}$—,
—$X^f$—$CONR^{4'}$—$C_6H_4$—,
—$R^{51'}$—$CONR^{4'}$—, or
—$R^{51'}$—$CONR^{4'}$—$C_6H_4$—. In the formulae, $X^f$, $R^{4'}$, $R^{51'}$ and $R^{52'}$ each have the same meanings as described above.

In particular, $X^{e'}$ can be more preferably
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$CONR^{4'}$—,
—$CONR^{4'}$—$C_6H_4$—,
—$X^f$—$CONR^{4'}$—, or
—$X^f$—$CONR^{4'}$—$C_6H_4$—.

In the present embodiment, specific examples of $X^{e'}$ include
a single bond,
a perfluoroalkylene group having 1 to 6 carbon atoms (for example, —$CF_2$—, —$(CF_2)_2$—),
an alkylene group having 1 to 6 carbon atoms,
—$CF_2$—$C_{1-6}$ alkylene group,
—CONH—,
—CONH—$CH_2$—,
—CONH—$(CH_2)_2$—,
—CONH—$(CH_2)_3$—,
—$CF_2$—CONH—,
—$CF_2$CONH$CH_2$—,
—$CF_2$CONH$(CH_2)_2$—,
—$CF_2$CONH$(CH_2)_3$—,
—CON($CH_3$)—,
—CON($CH_3$)—$CH_2$—,
—CON($CH_3$)—$(CH_2)_2$—,
—CON($CH_3$)—$(CH_2)_3$—,
—$CF_2$—CON($CH_3$)—,
—$CF_2$—CON($CH_3$) $CH_2$—,
—$CF_2$—CON($CH_3$)—$(CH_2)_2$—,
—$CF_2$—CON($CH_3$)—$(CH_2)_3$—,
—$CH_2$—CONH—,
—$CH_2$—CONH—$CH_2$—,
—$CH_2$—CONH—$(CH_2)_2$—,
—$CH_2$—CONH—$(CH_2)_3$—,
—$CF_2$—$CH_2$—CONH—,
—$CF_2$—$CH_2$—CONH—$CH_2$—,
—$CF_2$—$CH_2$—CONH—$(CH_2)_2$—,
—$CF_2$—$CH_2$—CONH—$(CH_2)_3$—,
—CONH—$C_6H_4$—,
—CON($CH_3$)—$C_6H_4$—,
—$CH_2$—CON($CH_3$)—$CH_2$—,
—$CH_2$—CON($CH_3$)—$(CH_2)_2$—,
—$CH_2$—CON($CH_3$)—$(CH_2)_3$—,
—CON($CH_3$)—$C_6H_4$—,
—$CF_2$—CONH—$C_6H_4$—,
—$CF_2$—CON($CH_3$)—$C_6H_4$—,
—$CF_2$—$CH_2$—CON($CH_3$)—$CH_2$—,
—$CF_2$—$CH_2$—CON($CH_3$)—$(CH_2)_2$—,
—$CF_2$—$CH_2$—CON($CH_3$)—$(CH_2)_3$—,
—$CF_2$—CON($CH_3$)—$C_6H_4$—,
—CO—,
—CO—$C_6H_4$—,
—$C_6H_4$—,
—$SO_2NH$—,
—$SO_2NH$—$CH_2$—,
—$SO_2NH$—$(CH_2)_2$—,
—$SO_2NH$—$(CH_2)_3$—,
—$SO_2NH$—$C_6H_4$—,
—$SO_2N(CH_3)$—,
—$SO_2N(CH_3)$—$CH_2$—,
—$SO_2N(CH_3)$—$(CH_2)_2$—,
—$SO_2N(CH_3)$—$(CH_2)_3$—,
—$SO_2N(CH_3)$—$C_6H_4$—,
—$SO_2$—,
—$SO_2$—$CH_2$—,
—$SO_2$—$(CH_2)_2$—,
—$SO_2$—$(CH_2)_3$—, or
—$SO_2$—$C_6H_4$—.

In the above list, examples of preferable $X^{e'}$ include an alkylene group having 1 to 6 carbon atoms,
a perfluoroalkylene group having 1 to 6 carbon atoms (for example, —$CF_2$— and —$(CF_2)_2$—),
a —$CF_2$—$C_{1-6}$ alkylene group,
—CONH—,
—CONH—$CH_2$—,
—CONH—$(CH_2)_2$—,
—CONH—$(CH_2)_3$—,
—$CF_2$CONH—,
—$CF_2$CONH$CH_2$—,
—$CF_2$CONH$(CH_2)_2$—,
—$CF_2$CONH$(CH_2)_3$—,
—CON($CH_3$)—,
—CON($CH_3$)—$CH_2$—,
—CON($CH_3$)—$(CH_2)_2$—,
—CON($CH_3$)—$(CH_2)_3$—,
—$CF_2$—CON($CH_3$)—,
—$CF_2$—CON($CH_3$)$CH_2$—,
—$CF_2$—CON($CH_3$)—$(CH_2)_2$—,
—$CF_2$—CON($CH_3$)—$(CH_2)_3$—, —CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH$_2$)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_6$H$_4$—
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH$_3$)—(CH$_2$)$_3$—, and
—CF$_2$—CON(CH$_3$)—C$_6$H$_4$.

In the above list, examples of more preferable $X^{e'}$ include
—CONH—,
—CONH—CH$_2$—,
—CONH—(CH$_2$)$_2$—,
—CONH—(CH$_2$)$_3$—,
—CF$_2$CONH—,
—CF$_2$CONHCH$_2$—,
—CF$_2$CONH(CH$_2$)$_2$—,
—CF$_2$CONH(CH$_2$)$_3$—,
—CON(CH$_3$)
—CON(CH$_3$)—CH$_2$—,
—CON(CH$_3$)—(CH$_2$)$_2$—,
—CON(CH$_3$)—(CH$_2$)$_3$—,
—CF$_2$—CON(CH$_3$)
—CF$_2$—CON(CH$_3$)CH$_2$—,
—CF$_2$—CON(CH$_3$)—(CH$_2$)$_2$—,
—CF$_2$—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH$_2$)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_5$H$_4$—
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH$_3$)—(CH$_2$)$_3$—, or
—CF$_2$—CON(CH$_3$)—C$_6$H$_4$—.

In one embodiment, $X^{e'}$ is a single bond. In the present embodiment, PFPE and a group having a binding ability to the base material (namely, group in parentheses with α1 in (A1) and (A2)) are directly bonded.

In still another embodiment, $X^1$ is a group represented by formula: —(R$^{16}$)$_x$—(CFR$^{17}$)$_y$—(CH$_2$)$_z$—. In the formula, x, y and z are each independently an integer of 0 to 10, the sum of x, y and z is 1 or more, and the occurrence order of the respective repeating units in parentheses is not limited in the formula.

In the formula, each R$^{16}$, at each occurrence, independently represents an oxygen atom, phenylene, carbazolylene, —NR$^{18}$—, wherein R$^{18}$ represents a hydrogen atom or an organic group, or a divalent organic group. Preferably, R$^{16}$ is an oxygen atom or a divalent polar group.

The "divalent polar group" is not limited, and examples thereof include —C(O)—, —C(=NR$^{19}$)—, and —C(O)NR$^{19}$—, wherein R$^{19}$ represents a hydrogen atom or a lower alkyl group. The "lower alkyl group" is, for example, an alkyl group having 1 to 6 carbon atoms, such as a methyl group, an ethyl group, or a n-propyl group, and such a group is optionally substituted with one or more fluorine atoms.

In the formula, each R$^{17}$, at each occurrence, is independently a hydrogen atom, a fluorine atom or a lower fluoroalkyl group, preferably a fluorine atom. The "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, further preferably a trifluoromethyl group.

In this embodiment, $X^1$ is preferably a group represented by formula: —(O)$_x$—(CF$_2$)$_y$—(CH$_2$)$_z$—, wherein x, y and z have the same meanings as described above, and the occurrence order of the respective repeating units in parentheses is not limited in the formula.

Examples of the group represented by formula: —(O)$_x$—(CF$_2$)$_y$—(CH$_2$)$_z$— include any group represented by —(O)$_{x'}$—(CH$_2$)$_{z''}$—O—[(CH$_2$)$_{z'''}$—O—]$_{z''''}$, and —(O)$_{x'}$—(CF$_2$)$_{y''}$—(CH$_2$)$_{z''}$—O—[(CH$_2$)$_{z'''}$—O—]$_{z''''}$, wherein x' is 0 or 1, y", z" and z''' are each independently an integer of 1 to 10, and z'''' is 0 or 1. Herein, a left end of such a group is bonding to PFPE.

In another preferable embodiment, $X^1$ is —O—CFR$^{20}$—(CF$_2$)$_{e'}$—.

Each R$^{20}$ independently represents a fluorine atom or a lower fluoroalkyl group. The lower fluoroalkyl group is, for example, a fluoroalkyl group having 1 to 3 carbon atoms, preferably a perfluoroalkyl group having 1 to 3 carbon atoms, more preferably a trifluoromethyl group or a pentafluoroethyl group, further preferably a trifluoromethyl group.

Each e' is independently 0 or 1.

In one specific example, R$^{20}$ is a fluorine atom and e' is 1.

In still another embodiment, examples of the $X^1$ group include the following groups:

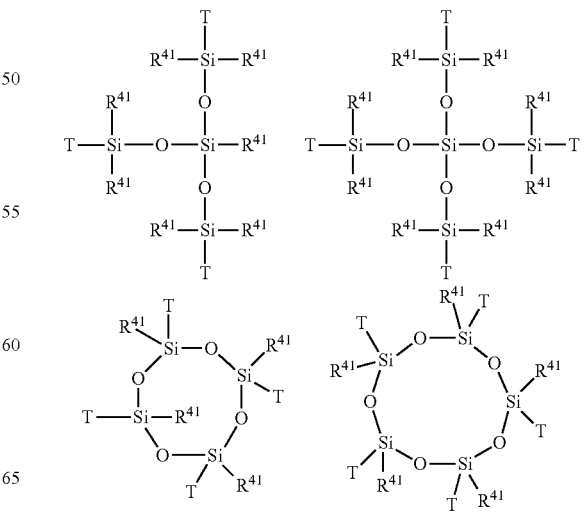

-continued

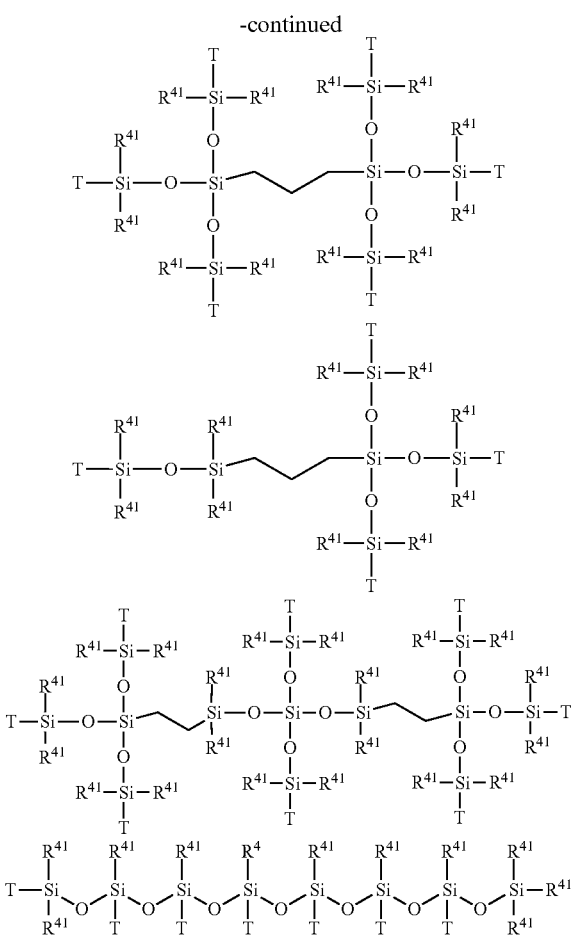

wherein each $R^{41}$ independently represents a hydrogen atom, a phenyl group, an alkyl group having 1 to 6 carbon atoms, or a $C_{1-6}$ alkoxy group, preferably a methyl group;

any number of the Ts in each $X^1$ group is the following group bonding to PFPE of a molecular backbone:

—$CH_2O(CH_2)_2$—,
—$CH_2O(CH_2)_3$—,
—$CF_2O(CH_2)_3$—,
—$CH_2$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$—, wherein Ph means phenyl, or

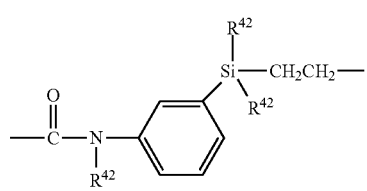

wherein each $R^{42}$ independently represents a hydrogen atom, a $C_{1-6}$ alkyl group or a $C_{1-6}$ alkoxy group, preferably a methyl group or a methoxy group, more preferably a methyl group, some other of the Ts is —$(CH_2)_{n''}$— ($n''$ is an integer of 2 to 6) bonding to a group opposite to PFPE of a molecular backbone, and the remaining T, if present, can be independently a methyl group, a phenyl group, a $C_{1-6}$ alkoxy group, or a radical scavenging group or an UV absorbing group. Also in the embodiment, a left portion and a right portion of the group designated as $X^1$ are connected to the group represented by PFPE and the group in parentheses with α1, respectively.

The radical scavenging group is not limited as long as it can scavenge a radial generated by light irradiation, and examples thereof include a residue of benzophenones, benzotriazoles, benzoates, phenyl salicylates, crotonic acids, malonates, organoacrylates, hindered amines, hindered phenols, or triazines.

The UV absorbing group is not limited as long as it can absorb ultraviolet light, and examples thereof include a residue of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferable embodiment, examples of a preferable radical scavenging group or an UV absorbing group include

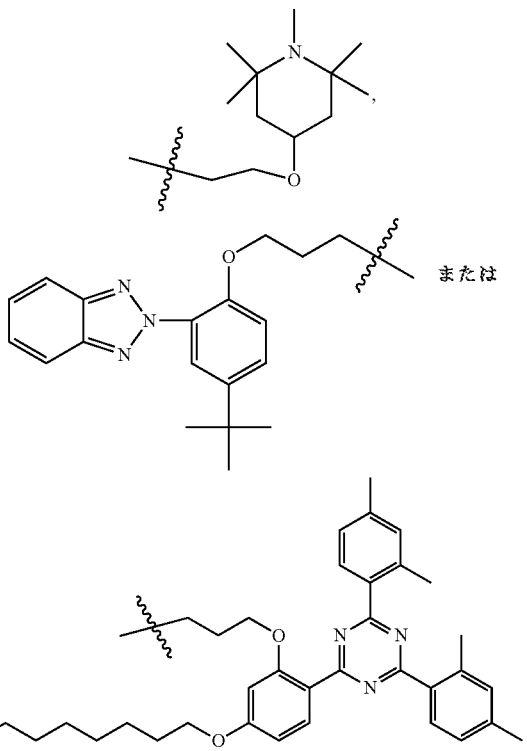

1 or

In this embodiment, $X^1$ (and, the following $X^3$, $X^5$ and $X^7$) can be a tri- to decavalent organic group.

In the formulae, each $X^2$, at each occurrence, independently represents a single bond or a divalent organic group. $X^2$ is preferably an alkylene group having 1 to 20 carbon atoms, more preferably —$(CH_2)_u$—, wherein u is an integer of 0 to 2.

In the formulae, each t is independently an integer of 1 to 10. In a preferable embodiment, t is an integer of 1 to 6. In another preferable embodiment, t is an integer of 2 to 10, preferably an integer of 2 to 6.

Preferable compounds represented by formulae (A1) and (A2) are compounds represented by the following formula (A1') and (A2'), respectively:

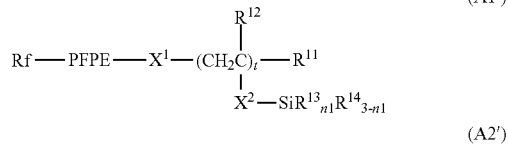
(A1')

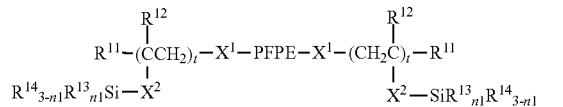
(A2')

wherein:
each PFPE is independently a group represented by formula:

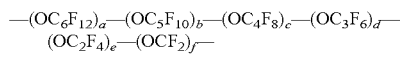

wherein a, b, c, d, e and f are each independently an integer of 0 or more and 200 or less, the sum of a, b, c, d, e and f is at least 1, and the occurrence order of the respective repeating units in parentheses with a, b, c, d, e or f is not limited in the formula;

each Rf, at each occurrence, independently represents an alkyl group having 1 to 16 carbon atoms, optionally substituted with one or more fluorine atoms;

each $R^{13}$, at each occurrence, independently represents a hydroxyl group or a hydrolyzable group;

each $R^{14}$, at each occurrence, independently represents a hydrogen atom or an alkyl group having 1 to 22 carbon atoms;

each $R^{11}$, at each occurrence, independently represents a hydrogen atom or a halogen atom;

each $R^{12}$, at each occurrence, independently represents a hydrogen atom or a lower alkyl group;

n1 is an integer of 1 to 3, preferably 3;

each $X^1$, at each occurrence, is independently —O—$CFR^{20}$—$(CF_2)_{e'}$—;

each $R^{20}$, at each occurrence, is independently a fluorine atom or a lower fluoroalkyl group;

each e', at each occurrence, is independently 0 or 1;

$X^2$ is —$(CH_2)_u$—;

each u, at each occurrence, is independently an integer of 0 to 2; and each t, at each occurrence, is independently an integer of 2 to 10.

Such any compound represented by formulae (A1) and (A2) can be obtained by, for example, introducing iodine into an end of a perfluoropolyether derivative corresponding to an Rf-PFPE-moiety, as a raw material, and then reacting a vinyl monomer corresponding to —$CH_2CR^{12}$ ($X^2$—$SiR^{13}_{n1}R^{14}_{3-n1}$)—.

Formulae (B1) and (B2):

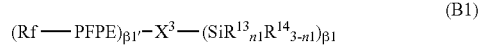
(B1)

(B2)

In formulae (B1) and (B2), Rf, PFPE, $R^{13}$, $R^{14}$ and n1 have the same meanings as described with respect to formulae (A1) and (A2).

In the formulae, each $X^3$ independently represents a single bond or a di- to decavalent organic group. $X^3$ is understood to be a linker which links a perfluoropolyether moiety (namely, Rf-PFPE moiety or -PFPE-moiety) mainly providing water-repellency, surface lubricity, and the like, and a silane moiety (specifically, —$SiR^{13}_{n1}R^{14}_{3-n1}$) providing a binding ability to the base material, in any compound represented by formulae (B1) and (B2). Accordingly, $X^3$ may be a single bond or any organic group as long as such any compound represented by formulae (B1) and (B2) can be stably present. Herein, a left portion and a right portion of the structure designated as $X^3$ are bonding to the group represented by PFPE and the group in parentheses with β1, respectively.

In another embodiment, $X^3$ represents $X^e$. $X^e$ has the same meaning as described above.

In the formulae, β1 is an integer of 1 to 9 and β1' is an integer of 1 to 9. Such β1 and β1' may be varied depending on the valence of $X^3$. In formula (B1), the sum of β1 and β1' is the same as the valence of $X^3$. For example, in the case where $X^3$ is a decavalent organic group, the sum of β1 and β1' can be 10, for example, β1 can be 9 and β1' can be 1, β1 can be 5 and β1' can be 5, or β1 can be 1 and β1' can be 9. In the case where $X^3$ is a divalent organic group, β1 and β1' are 1. In formula (B2), β1 corresponds to a value obtained by subtracting 1 from the value of the valence of $X^3$. In the case where $X^3$ is a single bond, β1 or β1' is 1.

$X^3$ is preferably a di- to heptavalent, more preferably di- to tetravalent, further preferably divalent organic group.

In one embodiment, $X^3$ is a di- to tetravalent organic group, β1 is 1 to 3, and β1' is 1.

In another embodiment, $X^3$ is a divalent organic group, β1 is 1, and β1' is 1. In such a case, formulae (B1) and (B2) are represented by the following formulae (B1') and (B2'), respectively.

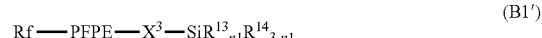
(B1')

(B2')

Examples of $X^3$ are not limited, and include the same as described with respect to $X^1$.

In particular, preferable specific examples of $X^3$ include a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—, —CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—Si(CH$_3$)$_2$—(CH$_2$)$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CO—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—, and
—OCFHCF$_2$—

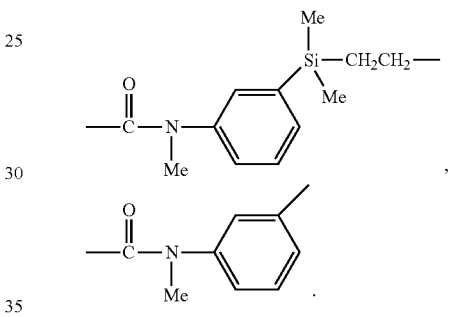

$X^3$ is preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
—(CH$_2$)$_5$—, —(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, $X^3$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In another preferable embodiment, $X^3$ represents $X^{e'}$. $X^{e'}$ has the same meaning as described above.

In one embodiment, $X^{e'}$ is a single bond. In the present embodiment, PFPE and a group having a binding ability to the base material (namely, group in parentheses with 01 in (B1) and (B2)) are directly bonded.

In one embodiment, at least two Si each bonding to the hydroxyl group or the hydrolyzable group are present in formulae (B1) and (B2). That is, at least two SiR$^{13}$ moieties are present in formulae (B1) and (B2).

Preferable compounds represented by formulae (B1) and (B2) are compounds represented by the following formulae (B1') and (B2'), respectively:

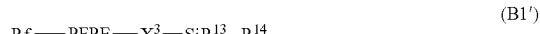

(B1')

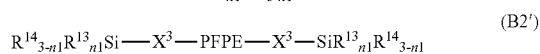

(B2')

wherein:
each PFPE is independently a group represented by formula:

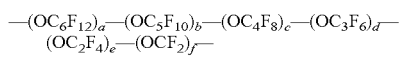

wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;

each Rf, at each occurrence, independently represents an alkyl group having 1 to 16 carbon atoms, optionally substituted with one or more fluorine atoms;

each $R^{13}$, at each occurrence, independently represents a hydroxyl group or a hydrolyzable group;

each $R^{14}$, at each occurrence, independently represents a hydrogen atom or an alkyl group having 1 to 22 carbon atoms;

n1 is an integer of 1 to 3, preferably 3; and
$X^3$ is —CH$_2$O(CH$_2$)$_2$—, —CH$_2$O(CH$_2$)$_3$— or —CH$_2$O(CH$_2$)$_6$—.

Such any compound represented by formulae (B1) and (B2) can be produced by a known method, for example, a method described in JP 2013-117012 A, or an improved method thereof.

Formulae (C1) and (C2):

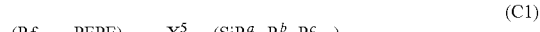

(C1)

(C2)

In formulae (C1) and (C2), Rf and PFPE have the same meanings as described with respect to formulae (A1) and (A2).

In the formulae, each $X^5$ independently represents a single bond or a di- to decavalent organic group. $X^s$ is understood to be a linker which links a perfluoropolyether moiety (namely, Rf-PFPE moiety or -PFPE-moiety) mainly providing water-repellency, surface lubricity, and the like, and a silane moiety (specifically, —SiR$^a_{k1}$R$^b_{l1}$R$^c_{m1}$ group) providing a binding ability to the base material, in any compound represented by formulae (C1) and (C2). Accordingly, $X^5$ may be a single bond or any organic group as long as such any compound represented by formulae (C1) and (C2) can be stably present. Herein, a left portion and a right portion of the structure designated as $X^5$ are bonding to the group represented by PFPE and the group in parentheses with γ1, respectively.

In another embodiment, $X^5$ represents $X^e$. $X^e$ has the same meaning as described above.

In the formulae, γ1 is an integer of 1 to 9 and γ1' is an integer of 1 to 9. Such γ1 and γ1' may be varied depending on the valence of $X^5$. In formula (C1), the sum of γ1 and γ1' is the same as the valence of $X^5$. For example, in the case where $X^5$ is a decavalent organic group, the sum of $\gamma 1$ and $\gamma 1'$ can be 10, for example, $\gamma 1$ can be 9 and $\gamma 1'$ can be 1, $\gamma 1$ can be 5 and $\gamma 1'$ can be 5, or $\gamma 1$ can be 1 and $\gamma 1'$ can be 9. In the case where $X^5$ is a divalent organic group, $\gamma 1$ and $\gamma 1'$ are 1. In formula (C2), $\gamma 1$ corresponds to a value obtained by subtracting 1 from the value of the valence of $X^s$. In the case where $X^5$ is a single bond, $\gamma 1$ or $\gamma 1'$ is 1.

$X^5$ is preferably a di- to heptavalent, more preferably di- to tetravalent, further preferably divalent organic group.

In one embodiment, $X^5$ is a di- to tetravalent organic group, $\gamma 1$ is 1 to 3, and $\gamma 1'$ is 1.

In another embodiment, $X^s$ is a divalent organic group, $\gamma 1$ is 1, and $\gamma 1'$ is 1. In such a case, formulae (C1) and (C2) are represented by the following formulae (C1') and (C2'), respectively.

$$Rf\text{—}PFPE\text{—}X^5\text{—}SiR^a{}_{k1}R^b{}_{l1}R^c{}_{m1} \quad (C1')$$

$$R^c{}_{m1}R^b{}_{l1}R^a{}_{k1}Si\text{—}X^5\text{—}PFPE\text{—}X^5\text{—}SiR^a{}_{k1}R^b{}_{l1}R^c{}_{m1} \quad (C2')$$

Examples of $X^s$ are not limited, and include the same as described with respect to $X^1$.

In particular, preferable specific examples of $X^5$ include a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—$C(O)NH$—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—CONH—,
—CONH—$CH_2$—,
—CONH—$(CH_2)_2$—,
—CONH—$(CH_2)_3$—,
—CONH—$(CH_2)_e$—,
—$CF_2$CONH—,
—$CF_2$CONHCH$_2$—,
—$CF_2$CONH$(CH_2)_2$—,
—$CF_2$CONH$(CH_2)_3$—,
—$CF_2$CONH$(CH_2)_6$—,
—CON(CH$_3$)—$(CH_2)_3$—,
—CON(Ph)-$(CH_2)_3$—, wherein Ph means phenyl,
—CON(CH$_3$)—$(CH_2)_6$—,
—CON(Ph)-$(CH_2)_6$—, wherein Ph means phenyl,
—$CF_2$—CON(CH$_3$)—$(CH_2)_3$—,
—$CF_2$—CON(Ph)-$(CH_2)_3$—, wherein Ph means phenyl,
—$CF_2$—CON(CH$_3$)—$(CH_2)_e$—,
—$CF_2$—CON(Ph)-$(CH_2)_6$—, wherein Ph means phenyl,
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—CONH—$(CH_2)_3Si(CH_3)_2OSi(CH_3)_2(CH_2)_2$—,
—CONH—$(CH_2)_3Si(CH_3)_2OSi(CH_3)_2OSi(CH_3)_2(CH_2)_2$—,
—CONH—$(CH_2)_3Si(CH_3)_2O(Si(CH_3)_2O)_2Si(CH_3)_2(CH_2)_2$—,
—CONH—$(CH_2)_3Si(CH_3)_2O(Si(CH_3)_2O)_3Si(CH_3)_2(CH_2)_2$—,
—CONH—$(CH_2)_3Si(CH_3)_2O(Si(CH_3)_2O)_{10}Si(CH_3)_2(CH_2)_2$—,
—CONH—$(CH_2)_3Si(CH_3)_2O(Si(CH_3)_2O)_{20}Si(CH_3)_2(CH_2)_2$—,
—C(O)O—$(CH_2)_3$—,
—C(O)O—$(CH_2)_6$—,
—$CH_2$—O—$(CH_2)_3$—Si(CH$_3$)$_2$—$(CH_2)_2$—Si(CH$_3$)$_2$—$(CH_2)_2$—,
—$CH_2$—O—$(CH_2)_3$—Si(CH$_3$)$_2$—$(CH_2)_2$—Si(CH$_3$)$_2$—CH(CH$_3$)—,
—$CH_2$—O—$(CH_2)_3$—Si(CH$_3$)$_2$—$(CH_2)_2$—Si(CH$_3$)$_2$—$(CH_2)_3$—,
—$CH_2$—O—$(CH_2)_3$—Si(CH$_3$)$_2$—$(CH_2)_2$—Si(CH$_3$)$_2$—CH(CH$_3$)—$CH_2$—,
—$OCH_2$—,
—$O(CH_2)_3$—, and
—$OCFHCF_2$—

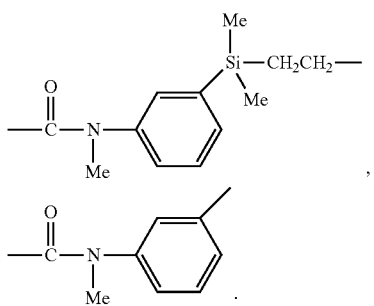

In particular, $X^5$ is preferably
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CF_2$—$CH_2OCF_2CHFOCF_2CF_2CF_2$—(O)NH—$CH_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONH$CH_2$—,
—$CF_2$CONH$(CH_2)_2$—,
—$CF_2$CONH$(CH_2)_3$—,
—$CF_2$CONH$(CH_2)_6$—,
—$CON(CH_3)$—$(CH_2)_3$—,
—CON(Ph)-$(CH_2)_3$—, wherein Ph means phenyl,
—$CON(CH_3)$—$(CH_2)_6$—,
—CON(Ph)-$(CH_2)_6$—, wherein Ph means phenyl,
—$CF_2$—$CON(CH_3)$—$(CH_2)_3$—,
—$CF_2$—CON(Ph)-$(CH_2)_3$—, wherein Ph means phenyl,
—$CF_2$—$CON(CH_3)$—$(CH_2)_6$—,
—$CF_2$—CON(Ph)-$(CH_2)_6$—, wherein Ph means phenyl,
—CONH—$(CH_2)_2$NH$(CH_2)_3$—,
—CONH—$(CH_2)_6$NH$(CH_2)_3$—,
—$CH_2$O—CONH—$(CH_2)_3$—,
—$CH_2$O—CONH—$(CH_2)_6$,
—$OCH_2$—,
—$O(CH_2)_3$—,
—$OCFHCF_2$—.

In particular, $X^5$ is more preferably
—$CH_2OCF_2CHFOCF_2CF_2CF_2$—C(O)NH—$CH_2$—,
—$CF_2$—$CH_2OCF_2CHFOCF_2CF_2CF_2$—C(O)NH—$CH_2$—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONH$CH_2$—,
—$CF_2$CONH$(CH_2)_2$—,
—$CF_2$CONH$(CH_2)_3$—,
—$CF_2$CONH$(CH_2)_6$—,
—$CON(CH_3)$—$(CH_2)_3$—,
—CON(Ph)-$(CH_2)_3$—, wherein Ph means phenyl,
—$CON(CH_3)$—$(CH_2)_e$—,
—CON(Ph)-$(CH_2)_6$—, wherein Ph means phenyl,
—$CF_2$—$CON(CH_3)$—$(CH_2)_3$—,
—$CF_2$—CON(Ph)-$(CH_2)_3$—, wherein Ph means phenyl,
—$CF_2$—$CON(CH_3)$—$(CH_2)_6$—,
—$CF_2$—CON(Ph)—$(CH_2)_6$—, wherein Ph means phenyl,
—CONH—$(CH_2)_2$NH$(CH_2)_3$—,
—CONH—$(CH_2)_6$NH$(CH_2)_3$—.

In another preferable embodiment, $X^5$ represents $X^{e'}$. $X^{e'}$ has the same meaning as described above.

In one embodiment, $X^{e'}$ is a single bond. In the present embodiment, PFPE and a group having a binding ability to the base material (namely, group in parentheses with γ1 in formulae (C1) and (C2)) are directly bonded.

In the formula, each $R^a$, at each occurrence, independently represents —$Z^3$—$SiR^{71}_{p1}R^{72}_{q1}R^{73}_{r1}$.

In the formula, each $Z^3$, at each occurrence, independently represents an oxygen atom or a divalent organic group.

$Z^3$ is preferably a divalent organic group, and does not encompass any group which is taken together with a Si atom at an end of a molecular backbone in formula (C1) or formula (C2) (Si atom to which $R^a$ is bonded) to form a siloxane bond.

$Z^3$ is preferably a $C_{1-6}$ alkylene group, —$(CH_2)_g$—O—$(CH_2)_h$—, wherein g is an integer of 1 to 6, h is an integer of 1 to 6), or -phenylene-$(CH_2)_i$—, wherein i is an integer of 0 to 6), more preferably a $C_{1-3}$ alkylene group. Such a group is optionally substituted with one or more substituents selected from, for example, a fluorine atom, a $C_{1-6}$ alkyl group, a $C_{2-6}$ alkenyl group and a $C_{2-6}$ alkynyl group. $Z^3$ is more preferably a linear or branched alkylene group, further preferably a linear alkylene group from the viewpoint of particularly favorable ultraviolet durability. The number of carbon atoms constituting the alkylene group of $Z^3$ is preferably in the range from 1 to 6, more preferably in the range from 1 to 3. The alkylene group is as described above.

In the formulae, each $R^{71}$, at each occurrence, independently represents $R^{a'}$. $R^{a'}$ has the same meaning as $R^a$.

The number of Si linearly linked via a $Z^3$ group is at most 5 in $R^a$. That is, in the case where at least one $R^{71}$ is present in $R^a$, two or more Si atoms linearly linked via a $Z^3$ group are present in $R^a$, and the number of such Si atoms linearly linked via a $Z^3$ group is at most 5. Herein, the "number of Si atoms linearly linked via a $Z^3$ group in $R^{a'''}$" is equal to the number of repeatings of —$Z^3$—Si— linearly linked in $R^a$.

One example is represented below, where Si atoms are linked via a $Z^3$ group in $R^a$.

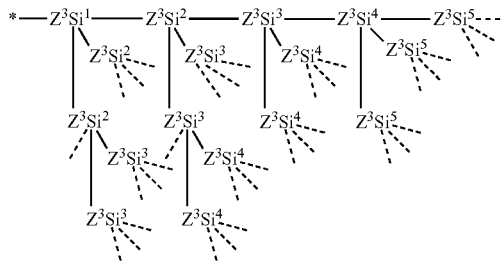

In the formula, "*" means a site bonding to Si of a main chain, and " . . . " means that a predetermined group other than $Z^3Si$ is bonded, namely, " . . . " means a position at which repeating of $Z^3Si$ is terminated in the case where all three bonds of a Si atom are " . . . ". The superscript number in Si means the number of occurrence of Si linearly linked via a $Z^3$ group when counted from "*". That is, a chain where repeating of $Z^3Si$ is terminated at $Si^2$ is a chain where the "number of Si atoms linearly linked via a $Z^3$ group in $R^{a'''}$" is 2, and similarly, chains where repeating of $Z^3Si$ is terminated at $Si^3$, $Si^4$ and $Si^5$ mean chains where the "number of Si atoms linearly linked via a $Z^3$ group in $R^{a'''}$" is 3, 4 and 5, respectively. As clear from the formula, a plurality of $Z^3Si$ chains are present in $R^a$, and all the chains do not necessarily have the same length, and, for example, may each have any length.

In a preferable embodiment, the "number of Si atoms linearly linked via a $Z^3$ group in $R^{a'''}$" is 1 (left formula) or 2 (right formula) in all chains, as represented below.

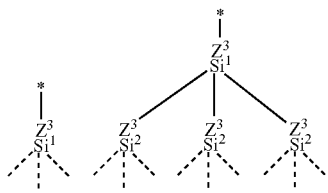

In one embodiment, the number of Si atoms linearly linked via a $Z^3$ group in $R^a$ is 1 or 2, preferably 1.

In the formulae, each $R^{72}$, at each occurrence, independently represents a hydroxyl group or a hydrolyzable group. The "hydrolyzable group" has the same meaning as described above.

Preferably, $R^{72}$ is —OR, wherein R represents a substituted or unsubstituted $C_{1-3}$ alkyl group, more preferably a methyl group.

In the formulae, each $R^{73}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p1, at each occurrence, is independently an integer of 0 to 3; each q1, at each occurrence, is independently an integer of 0 to 3; and each r1, at each occurrence, is independently an integer of 0 to 3, provided that the sum of p1, q1 and r1 with respect to (—$Z^3$—$SiR^{71}_{p1}R^{72}_{q1}R^{73}_{r1}$) is 3.

In a preferable embodiment, q1 in $R^{a'}$ ($R^a$ in the case where no $R^{a'}$ is present) at an end of $R^a$ is preferably 2 or more, for example, 2 or 3, more preferably 3.

In a preferable embodiment, at least one end of $R^a$ can be —Si(—$Z^3$—$SiR^{72}_{q1}R^{73}_{r1})_2R^{72}_{q1'}R^{73}_{r1'}$ (provided that either one of q1' and r1' is 1 and the other is 0), or —Si(—$Z^3$—$SiR^{72}_{q1}R^{73}_{r1})_3$, preferably —Si(—$Z^3$—$SiR^{72}_{q1}R^{73}_{r1})_3$ (wherein the total of q1 and r1 is 3). In the formula, a (—$Z^3$—$SiR^{72}_{q1}R^{73}_{r1}$) unit is preferably (—$Z^3$—$SiR^{72}_{3}$). In a further preferable embodiment, all ends of $R^a$ can be —Si(—$Z^3$—$SiR^{72}_{q1}R^{73}_{r1})_3$, preferably —Si(—$Z^3$—$SiR^{72}_{3})_3$.

In a preferable embodiment, an end of a group represented by ($SiR^a_{k1}R^b_{l1}R^c_{m1}$) can be —Si(—$Z^3$—$SiR^{72}_{q1}R^{73}_{r1})_2R^b_{l1}R^c_{m1}$ (provided that any one of l1 and m1 is 1 and the other is 0), —Si(—$Z^3$—$SiR^{72}_{q1}R^{73}_{r1})_2R^{72}_{q1'}R^{73}_{r1'}$ (provided that either one of q1' and r1' is 1 and the other is 0), or —Si(—$Z^3$—$SiR^{72}_{q1}R^{73}_{r1})_3$, preferably —Si(—$Z^3$—$SiR^{72}_{q1}R^{73}_{r1})_3$ (wherein the total of q1 and r1 is 3). More preferably, the end of a group represented by ($SiR^a_{k1}R^b_{l1}R^c_{m1}$) is —Si(—$Z^3$—$SiR^{72}_{3})_3$.

In formulae (C1) and (C2), at least one q1 is an integer of 1 to 3, namely, at least one $R^{72}$ is present.

In one embodiment, at least two Si each bonding to the hydroxyl group or the hydrolyzable group are present in formulae (C1) and (C2). That is, at least two $SiR^{72}$ and/or $SiR^b$ structures (which are each specifically a group selected from the group consisting of a group represented by —$Z^3$—$SiR^{71}_{p1}R^{72}_{q1}R^{73}_{r1}$ (wherein q1 is an integer of 1 to 3) and/or a group represented by —$SiR^a_{k1}R^b_{l1}R^c_{m1}$ (wherein l1 is an integer of 1 to 3)) are present.

In the formulae, each $R^b$, at each occurrence, independently represents a hydroxyl group or a hydrolyzable group. $R^b$ preferably represents a hydroxyl group, —OR, —OCOR, —O—N=C(R)$_2$, —N(R)$_2$, —NHR, or halogen, wherein R represents a substituted or unsubstituted alkyl group having 1 to 4 carbon atoms, and $R^b$ more preferably represents —OR. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and, may be generated by hydrolyzing the hydrolyzable group. More preferably, $R^b$ represents —OR, wherein R represents a substituted or unsubstituted $C_{1-3}$ alkyl group, more preferably a methyl group.

In the formulae, each $R^c$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each k1, at each occurrence, is independently an integer of 0 to 3; each l1, at each occurrence, is independently an integer of 0 to 3; and each m1, at each occurrence, is independently an integer of 0 to 3, provided that the sum of k1, l1 and m1 with respect to ($SiR^a_{k1}R^b_{l1}R^c_{m1}$) is 3.

In one embodiment, k1 is preferably 1 to 3, more preferably 3.

Such any compound represented by formulae (C1) and (C2) can be obtained by, for example, introducing a hydroxyl group into an end of a perfluoropolyether derivative corresponding to an Rf-PFPE-moiety, as a raw material, thereafter introducing a group having an unsaturated bond into an end, reacting the group having an unsaturated bond, and a silyl derivative having a halogen atom, further introducing a hydroxyl group and then a group having an unsaturated bond, into an end of the silyl group, and finally reacting the group having an unsaturated bond, introduced, and the silyl derivative.

For example, synthesis can be made as described in WO 2014/069592.

Formula (D1) and (D2):

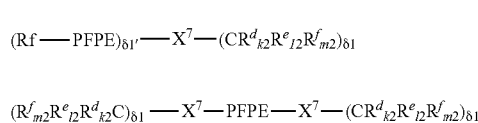

(D1)

(D2)

In formulae (D1) and (D2), Rf and PFPE have the same meanings as described with respect to formulae (A1) and (A2).

In the formula, each $X^7$ independently represents a single bond or a di- to decavalent organic group. $X^7$ is understood to be a linker which links a perfluoropolyether moiety (namely, Rf-PFPE moiety or -PFPE-moiety) mainly providing water-repellency, surface lubricity, and the like, and a moiety (namely, group in parentheses with δ1) providing a binding ability to the base material, in any compound represented by formulae (D1) and (D2). Accordingly, $X^7$ may be a single bond or any organic group as long as such any compound represented by formulae (D1) and (D2) can be stably present. Herein, a left portion and a right portion of the structure designated as $X^7$ are bonding to the group represented by PFPE and the group in parentheses with δ1, respectively.

In another embodiment, $X^7$ represents $X^e$. $X^e$ has the same meaning as described above.

In the formulae, δ1 is an integer of 1 to 9 and δ1' is an integer of 1 to 9. Such δ1 and δ1' may be varied depending on the valence of $X^7$. In formula (D1), the sum of δ1 and δ1' is the same as the valence of $X^7$. For example, in the case where $X^7$ is a decavalent organic group, the sum of δ1 and δ1' can be 10, for example, δl can be 9 and δ1' can be 1, δ1 can be 5 and δ1' can be 5, or δ1 can be 1 and δ1' can be 9. In the case where $X^7$ is a divalent organic group, δ1 and δ1' are 1. In formula (D2), δ1 corresponds to a value obtained by subtracting 1 from the valence of $X^7$. In the case where $X^7$ is a single bond, δ1 or δ1' is 1.

$X^7$ is preferably a di- to heptavalent, more preferably di- to tetravalent, further preferably divalent organic group.

In one embodiment, $X^7$ is a di- to tetravalent organic group, δ1 is 1 to 3, and δ1' is 1.

In another embodiment, $X^7$ is a divalent organic group, δ1 is 1, and δ1' is 1. In such a case, formulae (D1) and (D2) are represented by the following formulae (D1') and (D2'), respectively.

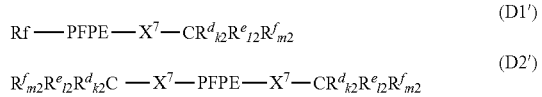

(D1')

(D2')

Examples of $X^7$ are not limited, and include the same as described with respect to $X^1$.

In particular, preferable specific examples of $X^7$ include a single bond,

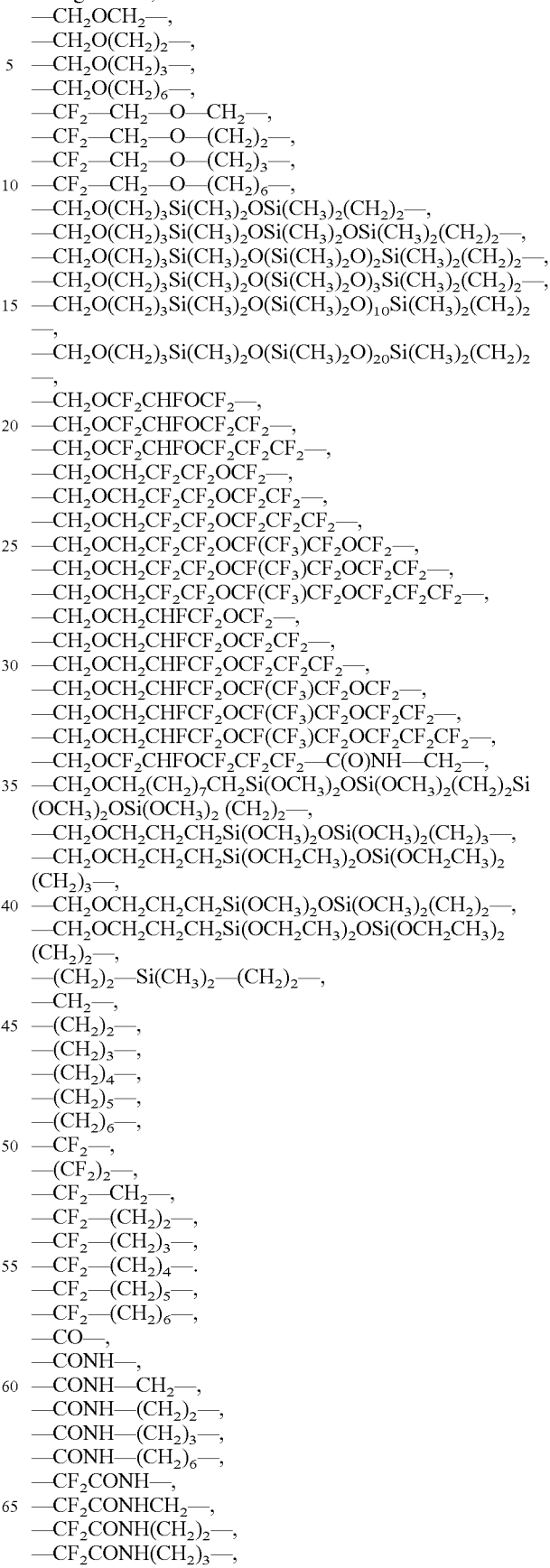

—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—, and
—OCFHCF$_2$—

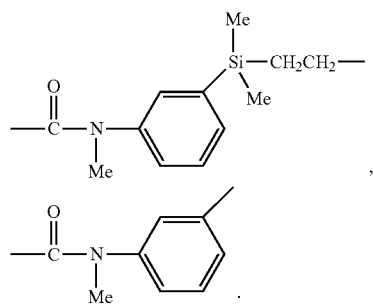

In particular, specific X$^7$ is more preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_a$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, X$^7$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl, —CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In a more preferable embodiment, $X^7$ represents $X^{e'}$. $X^{e'}$ has the same meaning as described above.

In one embodiment, $X^{e'}$ is a single bond. In the present embodiment, PFPE and a group having a binding ability to the base material (namely, group in parentheses with Si in formulae (D1) and (D2)) are directly bonded. It is considered that such a structure is included to thereby strengthen a bonding force between PFPE and the group in parentheses with Si. It is also considered that a carbon atom (namely, a carbon atom bonding to $R^d$, $R^e$ and $R^f$ in the group in parentheses with δ1) directly bonding to PFPE is less biased in charge and, as a result, a nucleophilic reaction or the like hardly occurs at the carbon atom and the compound is stably bonding to the base material. Such a structure has the advantage of being capable of more enhancing friction durability of a layer formed by the PFPE-containing silane compound.

In the formulae, each $R^d$, at each occurrence, independently represents —Z$^4$—CR$^{81}_{p2}$R$^{82}_{q2}$R$^{83}_{r2}$.

In the formulae, each $Z^4$, at each occurrence, independently represents an oxygen atom or a divalent organic group.

$Z^4$ is preferably a C$_{1-6}$ alkylene group, —(CH$_2$)$_g$—O—(CH$_2$)$_h$—, wherein g is an integer of 0 to 6, for example, an integer of 1 to 6, and h is an integer of 0 to 6, for example, an integer of 1 to 6, or -phenylene-(CH$_2$)$_i$—, wherein i is an integer of 0 to 6, more preferably a C$_{1-3}$ alkylene group. Such a group is optionally substituted with one or more substituents selected from, for example, a fluorine atom, a C$_{1-6}$ alkyl group, a C$_{2-6}$ alkenyl group and a C$_{2-6}$ alkynyl group.

In the formulae, each $R^{81}$, at each occurrence, independently represents $R^{d'}$. $R^{d'}$ has the same meaning as $R^d$.

The number of C linearly linked via a Z$^4$ group is at most 5 in $R^d$. That is, in the case where at least one $R^{81}$ is present in $R^d$, two or more C atoms linearly linked via a Z$^4$ group are present in $R^d$, and the number of such C atoms linearly linked via a Z$^4$ group is at most 5. Herein, the "number of C atoms linearly linked via a Z$^4$ group in $R^d$" is equal to the number of repeating units of —Z$^4$—C— linearly linked in $R^d$.

In a preferable embodiment, the "number of C atoms linearly linked via a Z$^4$ group in $R^d$" is 1 (left formula) or 2 (right formula) in all chains, as represented below.

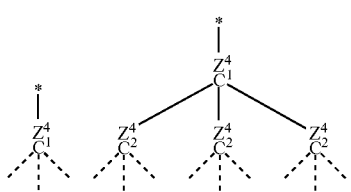

In one embodiment, the number of C atoms linearly linked via a Z$^4$ group in $R^d$ is 1 or 2, preferably 1.

In the formulae, each $R^{82}$, at each occurrence, independently represents —Y—SiR$^{85}_{n2}$R$^{85}_{3-n2}$.

Each Y, at each occurrence, independently represents a divalent organic group.

In a preferable embodiment, Y is a C$_{1-6}$ alkylene group, —(CH$_2$)$_{g'}$—O—(CH$_2$)$_{h'}$—, wherein g' is an integer of 0 to 6, for example, an integer of 1 to 6, and h' is an integer of 0 to 6, for example, an integer of 1 to 6, or -phenylene-(CH$_2$)$_{i'}$—, wherein i' is an integer of 0 to 6. Such a group is optionally substituted with one or more substituents selected from, for example, a fluorine atom, a C$_{1-6}$ alkyl group, a C$_{2-5}$ alkenyl group and a C$_{2-6}$ alkynyl group.

In one embodiment, Y can be a C$_{1-6}$ alkylene group or -phenylene-(CH$_2$)$_{i'}$—. In the case where Y is any of the above groups, light resistance, in particular, ultraviolet resistance can be more enhanced.

Each $R^{85}$, at each occurrence, independently represents a hydroxyl group or a hydrolyzable group.

Examples of the "hydrolyzable group" include the same as in formulae (C1) and (C2).

Preferably, $R^{85}$ is —OR, wherein R represents a substituted or unsubstituted C$_{1-3}$ alkyl group, more preferably an ethyl group or a methyl group, in particular, a methyl group.

Each $R^{86}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

n2 with respect to a (—Y—SiR$^{85}_{n2}$R$^{86}_{3-n2}$) unit independently represents an integer of 0 to 3, preferably an integer of 1 to 3, more preferably 2 or 3, particularly preferably 3.

Each $R^{83}$, at each occurrence, independently represents a hydrogen atom, a hydroxyl group or a lower alkyl group, preferably a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p2, at each occurrence, is independently an integer of 0 to 3; each q2, at each occurrence, is independently an integer of 0 to 3; and each r2, at each occurrence, is independently an integer of 0 to 3, provided that the sum of p2, q2 and r2 with respect to (—Z$^4$—CR$^{81}_{p2}$R$^{82}_{q2}$R$^{83}_{r2}$) is 3.

In a preferable embodiment, in $R^{d'}$ at an end of $R^d$ ($R^d$ in the case where no $R^{d'}$ is present), q2 is preferably 2 or more, for example, 2 or 3, more preferably 3.

In a preferable embodiment, at least one end of $R^d$ can be —C(—Y—SiR$^{85}_{n2}$R$^{85}_{3-n2}$)$_2$ (specifically, —C(—Y—SiR$^{85}_{n2}$R$^{86}_{3-n2}$)$_2$R$^{86}$) or —C(—Y—SiR$^{85}_{n2}$R$^{86}_{3-n2}$)$_3$, preferably —C(—Y—SiR$^{85}_{n2}$R$^{86}_{3-n2}$)3 Here, n2 is an integer of 1 to 3. In the formulae, a (—Y—SiR$^{85}_{n2}$R$^{86}_{3-n2}$) unit is preferably (—Y—SiR$^{85}_3$). In a further preferable embodiment, all ends of $R^{dl}$ can be each —C(—Y—SiR$^{85}_{n2}$R$^{86}_{3-n2}$)$_3$, preferably —C(—Y—SiR$^{85}_3$)$_3$.

In a more preferable embodiment, an end of a group represented by (CR$^d_k$2R$^e_{l2}$R$^f_{m}$2) is C(—Y—SiR$^{85}_{n2}$R$^{86}_{3-n2}$)$_2$R$^f$, C(—Y—SiR$^{85}_{n2}$R$^{86}_{3-n2}$)$_2$R$^{83}$ or C(—Y—SiR$^{85}_{n2}$R$^{86}_{3-n2}$)$_3$, preferably C(—Y—SiR$^{85}_{n2}$R$^{86}_{3-n2}$)$_3$. Here, n2 is an integer of 1 to 3. In the formulae, a (—Y—SiR$^{85}_{n2}$R$^{86}_{3-n2}$) unit is preferably (—Y—SiR$^{85}_3$). In a further preferable embodiment, all ends of the group can be each —C(—Y—SiR$^{85}_{n2}$R$^{86}_{3-n2}$)$_3$, preferably —C(—Y—SiR$^{85}_3$)$_3$.

In the formulae, each $R^e$, at each occurrence, independently represents —Y—SiR$^{85}_{n2}$R$^{86}_{3-n2}$. Here, Y, $R^{85}$, $R^{86}$ and n2 have the same meanings as described in $R^{82}$.

In the formulae, each $R^f$, at each occurrence, independently represents a hydrogen atom, a hydroxyl group or a lower alkyl group. Preferably, each $R^f$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each k2, at each occurrence, is independently an integer of 0 to 3; each l2, at each occurrence, is independently an integer of 0 to 3; and each m2, at each occurrence, is independently an integer of 0 to 3, provided that the sum of k2, l2 and m2 is 3.

In one embodiment, at least one k2 is 2 or 3, preferably 3.

In one embodiment, k2 is 2 or 3, preferably 3.

In one embodiment, l2 is 2 or 3, preferably 3.

In formulae (D1) and (D2), two or more groups represented by —Y—SiR$^{85}_{n2}$R$^{86}_{3-n2}$ are present. More preferably, one or more carbon atoms each bonding to two or more of —Y—SiR$^{85}_{n2}$R$^{86}_{3-n2}$ are present.

In formulae (D1) and (D2), one or more groups selected from a group represented by —C—R$^{d}_{k}$2 (Y—SiR$^{85}_{n2}$R$^{86}_{3-n2}$)$_{l2}$R$^{f}_{m}$2 (provided that l2 is 2 or 3 and the total of k2, l2 and m2 is 3) and a group represented by —C—R$^{81}_{p}$2 (Y—SiR$^{85}_{n2}$R$^{86}_{3-n2}$)$_{q2}$R$^{83}_{r2}$ (provided that q2 is 2 or 3 and the total of p2, q2 and r2 is 3) are more preferably present, wherein n2 is an integer of 1 to 3.

In one embodiment, one or more groups represented by —C—(Y—SiR$^{85}_{n2}$R$^{86}_{3-n2}$)$_2$ are preferably present, wherein n2 is an integer of 1 to 3).

In one embodiment, in formulae (D1) and (D2), one or more groups represented by —C—(Y—SiR$^{85}_{n2}$R$^{86}_{3-n2}$)$_3$ are preferably present, wherein n2 is an integer of 1 to 3.

In formulae (D1) and (D2), n2 is an integer of 1 to 3 and at least one q2 is 2 or 3 or at least one l2 is 2 or 3. That is, at least two —Y—SiR$^{85}_{n2}$R$^{86}_{3-n2}$ groups are present in the formulae.

The PFPE-containing silane compound represented by Formula (D1) or formula (D2) can be produced by combining known methods. For example, a compound represented by formula (D1') where X$^7$ is divalent can be produced as follows, without any limitation.

A double bond-containing group (preferably allyl) and halogen (preferably bromo) are introduced into a polyhydric alcohol represented by HO—X$^7$—C(YOH)$_3$, wherein X$^7$ and Y are each independently a divalent organic group, thereby providing a double bond-containing halide represented by Hal-X$^7$—C(Y—O—R—CH=CH$_2$)$_3$, wherein Hal is halogen, for example, Br, and R is a divalent organic group, for example, an alkylene group. Next, halogen at an end and a perfluoropolyether group-containing alcohol represented by R$^{PFPE}$—OH, wherein R$^{PFPE}$ is a perfluoropolyether group-containing group, are reacted, thereby providing R$^{PFPE}$—O—X$^7$—C(Y—O—R—CH=CH$_2$) 3. Next, —CH=CH$_2$ at an end, and HSiCl$_3$ and an alcohol or HSiR$^{85}_3$ are reacted. Thus, R$^{PFPE}$—O—X$^7$—C(Y—O—R—CH$_2$—CH$_2$—SiR$^{85}_3$)$_3$ can be obtained.

The PFPE-containing silane compound can have a number average molecular weight of 5×10$^2$ to 1×10$^5$, without any limitation. In particular, the compound preferably has a number average molecular weight of 2,000 to 30,000, more preferably 2,500 to 12,000, further preferably 3,000 to 6,000. In the present invention, the number average molecular weight is defined as a value obtained by $^{19}$F-NMR measurement.

In a preferable embodiment, the PFPE-containing silane compound can be a compound represented by formula (A1), (A2), (C1), (C2), (D1) or (D2). Such a silane compound can be used to thereby allow adhesion properties to the base material to be enhanced.

In another preferable embodiment, on at least one end of the PFPE-containing silane compound, there is two or more, preferably three or more Si atoms each having a hydroxyl group or a hydrolyzable group.

In one embodiment, the surface treatment composition of the present invention includes 0.1% by mol or more and 35% by mol or less of any compound represented by formulae (A1), (B1), (C1) and (D1) based on the total of any compound represented by formulae (A1), (B1), (C1) and (D1) (hereinafter, also referred to as "component (1)") and any compound represented by formulae (A2), (B2), (C2) and (D2) (hereinafter, also referred to as "component (2)"). The lower limit of the content of any compound represented by formulae (A1), (B1), (C1) and (D1) based on the total of the component (1) and the component (2) can be preferably 0.1% by mol, more preferably 0.2% by mol, further preferably 0.5% by mol, still more preferably 1% by mol, particularly preferably 2% by mol, particularly preferably 5% by mol. The upper limit of the content of any compound represented by formulae (A1), (B1), (C1) and (D1) based on the total of the component (1) and the component (2) can be preferably 35% by mol, more preferably 30% by mol, further preferably 20% by mol, still more preferably 15% by mol or 10% by mol. Any compound represented by formulae (A1), (B1), (C1) and (D1) based on the total of the component (1) and the component (2) is preferably 0.1% by mol or more and 30% by mol or less, more preferably 0.1% by mol or more and 20% by mol or less, further preferably 0.2% by mol or more and 10% by mol or less, still more preferably 0.5% by mol or more and 10% by mol or less, particularly preferably 1% by mol or more and 10% by mol or less, for example, 2% by mol or more and 10% by mol or less or 5% by mol or more and 10% by mol or less. The component (1) can be included in the range, thereby allowing friction durability of a cured product obtained by use of the surface-treating agent of the present invention to be more enhanced.

The combination of the component (1) and the component (2) in the surface treatment composition is preferably a combination of a compound represented by formula (A1) and a compound represented by formula (A2), a combination of a compound represented by formula (B1) and a compound represented by formula (B2), a combination of a compound represented by formula (C1) and a compound represented by formula (C2), or a combination of a compound represented by formula (D1) and a compound represented by formula (D2).

In such any compound represented by formula (A1) and formula (A2), t is preferably 2 or more, more preferably an integer of 2 to 10, further preferably an integer of 2 to 6. Here, t can be 2 or more, thereby allowing a plurality of Si atoms each having R$^{13}$ to be present and allowing higher durability (for example, friction durability) to be achieved.

In such any compound represented by formula (C1) and formula (C2), k1 is preferably 2 or 3, more preferably 3.

In a preferable embodiment, such any compound represented by formula (C1) and formula (C2) has —Si—(Z$^3$—SiR$^{72}_3$)$_2$ (specifically, —Si—R$^{a}_2$R$^{b}_{l1}$R$^{c}_{m1}$ wherein R$^a$ is a group represented by —Z$^3$—SiR$^{72}_3$ and the total of l1 and m1 is 1, or —Si—R$^{71}_2$R$^{72}_{q1}$R$^{73}_{r1}$ wherein R$^{71}$ is a group represented by —Z$^3$—SiR$^{72}_3$ and the total of q1 and r1 is 1) or a —Si—(Z$^3$—SiR$^{72}_3$)$_3$ structure, further preferably a —Si—(Z$^3$—SiR$^{72}_3$)$_3$ structure, at an end. Such a structure can be at an end, thereby allowing higher durability (for example, friction durability) to be obtained.

In such any compound represented by formula (D1) and formula (D2), l2 is preferably 2 or 3, more preferably 3.

In a preferable embodiment, such any compound represented by formula (D1) and formula (D2) has a —C—(Y—SiR$^{85}$$_3$)$_2$ (specifically, —C—(Y—SiR$^{85}$$_3$)$_2$R$^{83}$ or —C—(Y—SiR$^{85}$$_3$)$_2$R$^f$) or —C—(Y—SiR$^{85}$)$_3$ structure, further preferably a —C—(Y—SiR$^{85}$)$_3$ structure, at an end. Such a structure can be at an end, thereby allowing higher durability (for example, friction durability) to be obtained.

In one embodiment, a Si atom bonding to at least one group selected from the group consisting of a hydroxyl group and a hydrolyzable group is preferably contained at each of both ends of a molecular backbone of the PFPE-containing silane compound. The molecular backbone of the PFPE-containing silane compound here represents a relatively longest binding chain in a molecule of the PFPE-containing silane compound.

In the embodiment, specifically, the PFPE-containing silane compound is preferably at least one compound represented by formula (A), (B), (C) or (D).

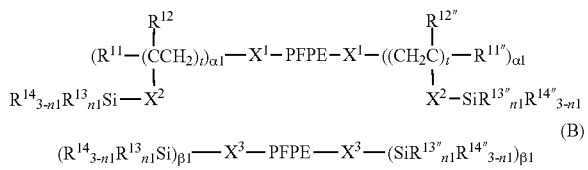

(A)

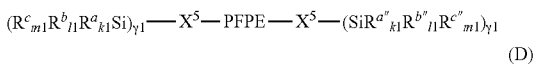

(B)

(C)

(R$^c$$_{m1}$R$^b$$_{l1}$R$^a$$_{k1}$Si)$_{\gamma1}$—X$^5$—PFPE—X$^5$—(SiR$^{a''}$$_{k1}$R$^{b''}$$_{l1}$R$^{c''}$$_{m1}$)$_{\gamma1}$ (D)

(R$^f$$_{m2}$R$^e$$_{l2}$R$^d$$_{k2}$C)$_{\delta1}$—X$^7$—PFPE—X$^7$—(CR$^{d''}$$_{k2}$R$^{e''}$$_{l2}$R$^{f''}$$_{m2}$)$_{\delta1}$ The description of formula (A), (B), (C) or (D), overlapped with those of (A1), (A2), (B1), (B2), (C1), (C2), (D1) and (D2), may be omitted. For example, symbols in formulae (A), (B), (C) and (D), when are the same as symbols in (A1), (A2), (B1), (B2), (C1), (C2), (D1) and (D2), respectively, have the same meanings as symbols in (A1), (A2), (B1), (B2), (C1), (C2), (D1) and (D2), respectively.

In formula (A), R$^{11''}$, R$^{12''}$, R$^{13''}$ and R$^{14''}$ have the same meanings as R$^{11}$, R$^{12}$, R$^{13}$ and R$^{14}$, respectively.

In formula (A), the Si atom bonding to at least one group selected from the group consisting of a hydroxyl group and a hydrolyzable group indicates a Si atom included in (—SiR$^{13}$$_{n1}$R$^{14}$$_{3-n1}$) or (—SiR$^{13''}$$_{n1}$R$^{14''}$$_{3-n1}$) where n1 is an integer of 1 to 3.

In formula (A), n1 with respect to each (—SiR$^{13}$$_{n1}$R$^{14}$$_{3-n1}$) unit or each (—SiR$^{13''}$$_{n1}$R$^{14''}$$_{3-n1}$) unit is independently an integer of 0 to 3, preferably 1 to 3, more preferably 3.

In formula (A), at least two n1(s) are each an integer of 1 to 3, namely, there is not any case where all n1(s) are simultaneously 0. In formula (A), the Si atom bonding to at least one group selected from the group consisting of a hydroxyl group and a hydrolyzable group is present at each of both ends of a molecular backbone. That is, at least one —SiR$^{13}$$_{n1}$R$^{14}$$_{3-n1}$ structure (namely, —SiR$^{13}$ moiety) where n1 is 1 or more and at least one —SiR$^{13''}$$_{n1}$R$^{14''}$$_{3-n1}$ structure (namely, —SiR$^{13''}$ moiety) where n1 is 1 or more are preferably present in formula (A).

In formula (B), R$^{13''}$ and R$^{14''}$ have the same meanings as R$^{13}$ and R$^{14}$, respectively.

In formula (B), the Si atom bonding to at least one group selected from the group consisting of a hydroxyl group and a hydrolyzable group indicates a Si atom included in (—SiR$^{13}$$_{n1}$R$^{14}$$_{3-n1}$) or (—SiR$^{13''}$$_{n1}$R$^{14''}$$_{3-n1}$) where n1 is an integer of 1 to 3.

In formula (B), n1 with respect to each (—SiR$^{13}$$_{n1}$R$^{14}$$_{3-n1}$) unit or each (—SiR$^{13''}$$_{n1}$R$^{14''}$$_{3-n1}$) unit is independently an integer of 0 to 3, preferably 1 to 3, more preferably 3. In formula (B), at least two n1(s) are each an integer of 1 to 3, namely, there is not any case where all n1(s) are simultaneously 0. In formula (B), at least one —SiR$^{13}$ moiety is present and at least one —SiR$^{13''}$ moiety is present.

In formula (C), each R$^{a''}$, at each occurrence, independently represents —Z$^3$—SiR$^{71}$$_{p1}$R$^{72''}$$_{q1}$R$^{73}$$_{r1}$. R$^{72''}$ has the same meaning as R$^{72}$.

In a preferable embodiment, at least one end of R$^{a''}$ can be —Si(—Z$^3$—SiR$^{72''}$$_{q1'}$R$^{73}$$_{r1}$)$_2$R$^{72''}$$_{q1'}$R$^{73}$$_{r1'}$ (provided that either one of q1' and r1' is 1 and the other is 0), or —Si(—Z$^3$—SiR$^{72''}$$_{q1}$R$^{73}$$_{r1}$)$_3$, preferably —Si(—Z$^3$—SiR$^{72''}$$_{q1}$R$^{73}$$_{r1}$)$_3$—. In the formula, a (—Z$^3$—SiR$^{72''}$$_{q1}$R$^{73}$$_{r1}$) unit is preferably (—Z$^3$—SiR$^{72''}$$_3$). In a further preferable embodiment, all ends of R$^a$ can be —Si(—Z$^3$—SiR$^{72''}$$_{q1}$R$^{73}$$_{r1}$)$_3$, preferably —Si(—Z$^3$—SiR$^{72''}$$_3$)$_3$. Here, the total of q1 and r1 is 3.

In formula (C), at least one structure of SiR$^{72}$ and/or SiR$^b$ (specifically a group selected from the group consisting of a group represented by —Z$^3$—SiR$^{71}$$_{p1}$R$^{72}$$_{q1}$R$^{73}$$_{r1}$, provided that q1 is an integer of 1 to 3, and/or a group represented by —SiR$^a$$_{k1}$R$^b$$_{l1}$R$^c$$_{m1}$, provided that l1 is an integer of 1 to 3), and at least one structure of SiR$^{72''}$ and/or SiR$^{b''}$ (specifically a group selected from the group consisting of a group represented by —Z$^3$—SiR$^{71}$$_{p1}$R$^{72}$$_{q1}$R$^{73}$$_{r1}$, provided that q1 is an integer of 1 to 3, and/or a group represented by —SiR$^a$$_{k1}$R$^b$$_{l1}$R$^c$$_{m1}$, provided that l1 is an integer of 1 to 3) are present.

In formula (C), R$^{b''}$ and R$^{c''}$ have the same meanings as R$^b$ and R$^c$, respectively.

In formula (D), each R$^{d''}$, at each occurrence, independently represents —Z$^4$—CR$^{81}$$_{p2}$R$^{82''}$$_{q2}$R$^{83}$$_{r2}$. Each R$^{82''}$, at each occurrence, independently represents —Y—SiR$^{85''}$$_{n2}$R$^{86''}$$_{3-n2}$. R85'', R$^{86''}$ have the same meanings as R$^{85}$, R$^{86}$, respectively.

In formula (D), in a preferable embodiment, in R$^{d'}$ at an end of R$^{d''}$ (R$^{d''}$ in the case where no R$^{d'}$ is present), q2 is preferably 2 or more, for example, 2 or 3, more preferably 3.

In formula (D), in a preferable embodiment, at least one end of R$^{d''}$ can be —C(—Y—SiR$^{85''}$$_{n2}$R$^{86''}$$_{3-n2}$)$_2$ (specifically, —C(—Y—SiR$^{85''}$$_{n2}$R$^{86''}$$_{3-n2}$)$_2$R$^{83}$) or —C(—Y—SiR$^{85''}$$_{n2}$R$^{86''}$$_{3-n2}$)$_3$, preferably —C(—Y—SiR$^{85''}$$_{n2}$R$^{86''}$$_{3-n2}$)$_3$. Here, n2 is an integer of 1 to 3. In the formulae, a (—Y—SiR$^{85''}$$_{n2}$R$^{86''}$$_{3-n2}$) unit is preferably (—Y—SiR$^{85''}$$_3$). In a further preferable embodiment, all ends of R$^d$ can be each —C(—Y—SiR$^{85''}$$_{n2}$R$^{86''}$$_{3-n2}$)$_3$, preferably —C(—Y—SiR$^{85''}$$_3$)$_3$.

In one embodiment, an end of a group represented by (CR$^{d''}$$_{k2}$R$^{e''}$$_{l2}$R$^{f''}$$_{m2}$) is C(—Y—SiR$^{85''}$$_{n2}$R$^{86''}$$_{3-n2}$)$_2$R$^{f''}$, —C(—Y—SiR$^{85''}$$_{n2}$R$^{86''}$$_{3-n2}$)$_2$R$^{83}$ or C(—Y—SiR$^{85''}$$_{n2}$R$^{86''}$$_{3-n2}$)$_3$, preferably C(—Y—SiR$^{85''}$$_{n2}$R$^{86''}$$_{3-n2}$)$_3$. Here, n2 is an integer of 1 to 3. In the formulae, a (—Y—SiR$^{85''}$$_{n2}$R$^{86''}$$_{3-n2}$) unit is preferably (—Y—SiR$^{85''}$$_3$). In a further preferable embodiment, all ends of the group can be each —C(—Y—SiR$^{85''}$$_{n2}$R$^{86''}$$_{3-n2}$)$_3$, preferably —C(—Y—SiR$^{85''}$$_3$)$_3$.

In formula (D), each R$^{e''}$, at each occurrence, independently represents —Y—SiR$^{85''}$$_{n2}$R$^{86''}$$_{3-n2}$.

In formula (D), R$^{f''}$ has the same meaning as R$^f$.

In formula (D), one or more groups represented by —Y—SiR$^{85}$$_{n2}$R$^{86}$$_{3-n2}$ and one or more groups represented by —Y—SiR$^{85''}_{n2}$R$^{86''}_{3-n2}$ are present. More preferably, one or more carbon atoms each bonding to two or more groups represented by —Y—SiR$^{85}_{n2}$R$^{86}_{3-n2}$ are present and one or more carbon atoms each bonding to two or more groups represented by —Y—SiR$^{85''}_{n2}$R$^{86''}_{3-n2}$ are present. In the formulae, n2 is an integer of 1 to 3. That is, in formula (D), one or more groups selected from a group represented by —C—R$^{d}_{k2}$ (Y—SiR$^{85}_{n2}$R$^{86}_{3-n2}$)$_{l2}$R$^{f}_{m2}$ (provided that 12 is 2 or 3 and the total of k2, l2 and m2 is 3) and a group represented by —C—R$^{81}_{p2}$ (Y—SiR$^{85}_{n2}$R$^{86}_{3-n2}$)$_{q2}$R$^{83}_{r2}$ (provided that q2 is 2 or 3 and the total of p2, q2 and r2 is 3), and one or more groups selected from a group represented by —C—R$^{d''}_{k2}$ (Y—SiR$^{85''}_{n2}$R$^{86''}_{3-n2}$)$_{l2}$R$^{f''}_{m2}$ (provided that l2 is 2 or 3 and the total of k2, l2 and m2 is 3) and a group represented by —C—R$^{81}_{p2}$ (Y—SiR$^{85''}_{n2}$R$^{86''}_{3-n2}$)$_{q2}$R$^{83}_{r2}$ (provided that q2 is 2 or 3 and the total of p2, q2 and r2 is 3) are preferably present, wherein n2 is an integer of 1 to 3.

In one embodiment, in formula (D), one or more groups represented by —C—(Y—SiR$^{85}_{n2}$R$^{86}_{3-n2}$)$_2$ and one or more groups represented by —C—(Y—SiR$^{85''}_{n2}$R$^{86''}_{3-n2}$)$_2$ are preferably present, wherein n2 is an integer of 1 to 3.

In one embodiment, in formula (D), one or more groups represented by —C—(Y—SiR$^{85}_{n2}$R$^{86}_{3-n2}$)$_3$ and one or more groups represented by —C—(Y—SiR$^{85''}_{n2}$R$^{86''}_{3-n2}$)$_3$ are preferably present, wherein n2 is an integer of 1 to 3.

(Solvent)

The solvent here used is preferably a fluorine atom-containing solvent. Examples of the solvent include:

a fluorine atom-containing solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane ((Zeorora H (trade name) or the like), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methylpentadecafluoroheptylketone, trifluoroethanol, pentafluoropropanol, hexafluoroisopropanol, $HCF_2CF_2CH_2OH$, methyltrifluoromethanesulfonate, trifluoroacetic acid, $CF_3O(CF_2CF_2O)_{m1}(CF_2O)_{n1}CF_2CF_3$, wherein m1 and n1 are each independently an integer of 0 or more and 1000 or less and the occurrence order of the respective repeating units in parentheses with m1 or n1 is not limited in the formula, provided that the sum of m1 and n1 is 1 or more, 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, 1,1,1,4,4,4-hexafluoro-2-butene, ethyl perfluorobutyl ether, methylthyl perfluorobutyl ether, methyl perfluorohexyl ether and methyl perfluorobutyl ether. Such a solvent may be used singly or as a mixture of two or more kinds thereof.

In particular, a preferable solvent is a fluorine atom-containing solvent. The fluorine atom-containing solvent here used is preferably at least one selected from the group consisting of ethyl perfluorobutyl ether and methyl perfluorohexyl ether. Such a solvent is used to thereby allow storage stability of the surface treatment composition of the present invention to be enhanced. Such a solvent can also contribute to suppression of the variation in physical properties (for example, friction durability) of a surface-treating layer to be obtained.

The content of water contained in the solvent is preferably 100 ppm by mass or less, more preferably 50 ppm by mass or less. The lower limit of the content of water contained in the solvent is not limited, and is, for example, 1 ppm by mass or more. The content of water can be measured with a Karl Fischer method. Such a content of moisture can allow storage stability of the surface treatment composition to be enhanced.

The proportion of the PFPE-containing silane compound based on 100 parts by mass of the total of the PFPE-containing silane compound and the solvent in the surface treatment composition of the present invention is in the range from 30 to 99 parts by mass. The proportion of the PFPE-containing silane compound based on 100 parts by mass of the total of the PFPE-containing silane compound and the solvent in the surface treatment composition of the present invention is preferably 40 parts by mass or more, more preferably 50 parts by mass or more, further preferably more than 50 parts by mass, and preferably 90 parts by mass or less, more preferably 80 parts by mass or less.

The proportion of the PFPE-containing silane compound based on 100 parts by mass of the total of the PFPE-containing silane compound and the solvent in the surface treatment composition of the present invention is preferably in the range from 40 to 90 parts by mass, more preferably in the range from 50 to 80 parts by mass, further preferably in the range from more than 50% by mass to 80 parts by mass.

The content of water contained in the surface treatment composition of the present invention is preferably 20 ppm by mass or less relative to the surface treatment composition. The lower limit of the content of water contained in the surface treatment composition is not limited, and no water may be substantially contained (for example, 0 ppm by mass). The content of water can be measured by use of a Karl Fischer method. The content of water can be in the range to thereby allow storage stability of the surface treatment composition to be enhanced. The content of water can be in the range to thereby allow stability (for example, storage stability) of the surface treatment composition of the present invention to be enhanced.

The viscosity of the surface treatment composition of the present invention is preferably in the range from 5 to 1000 mPa·s. The viscosity of the surface treatment composition is more preferably 100 mPa·s or less, further preferably 60 mPa·s or less, particularly preferably 50 mPa·s or less. The viscosity of the surface treatment composition is more preferably 3 mPa·s or more, particularly preferably 5 mPa·s or more.

Preferably, the viscosity of the surface treatment composition is in the range from 3 to 60 mPa·s, more preferably in the range from 5 to 50 mPa·s.

The viscosity corresponds to a viscosity at 25° C., as determined by a B-type viscometer, and can be measured according to JIS K7117-1:1999.

The surface treatment composition of the present invention can have such a viscosity, thereby allowing handleability to be more enhanced.

The PFPE-containing silane compound can be contained at the concentration, thereby allowing removal of the solvent contained in the surface treatment composition to be facilitated and allowing the time taken for removal of the solvent to be decreased in formation of a layer (surface-treating layer) obtained from the surface treatment composition. Such a surface treatment composition containing the PFPE-containing silane compound at the concentration can be used to thereby allow contamination of an apparatus due to the solvent removed, to be suppressed.

In the case where the concentration of the PFPE-containing silane compound is low (for example, 10 to 25% by mass based on the total amount of the PFPE-containing silane compound and the solvent) in the case of formation of such a layer with, for example, a deposition method (specifically, vacuum deposition method), the duration taken for reaching an objective degree of vacuum (for example, 3.0×10³ MPa) can be longer as compared with a case where a composition including only the PFPE-containing silane compound is used. On the contrary, in case of forming such a layer with a deposition method (specifically, vacuum deposition method), when the surface treatment composition of the present invention includes the PFPE-containing silane compound at the concentration falling within the range thereof, it can reach an objective degree of vacuum at equivalent to the time taken in the case of use of a composition containing 100% by mass of the PFPE-containing silane compound.

Conventionally, sudden boiling of a remaining solvent in formation of a surface-treating layer has sometimes caused any unevenness or defect (spot) on the surface-treating layer (in particular, the surface thereof).

On the contrary, the surface treatment composition of the present invention contains the PFPE-containing silane compound at the concentration and thus such unevenness or defect (spot) is hardly caused.

In the case where the concentration of a PFPE-containing silane compound is low (for example, 10 to 25% by mass based on the total amount of a fluorine-containing silane compound and a solvent), physical properties (for example, water-repellency, oil-repellency, antifouling property, surface lubricity, and friction durability, in particular, friction durability) of a surface-treating layer formed may be sometimes varied. In addition, physical properties of such a surface-treating layer may be sometimes inferior. The reason for this is considered because a solvent removed from a surface treatment composition in formation of such a surface-treating layer may sometimes cause an apparatus, and a material (for example, a base material) for use in formation of such a surface-treating layer to be contaminated and such contamination can inhibit a formation reaction of such a surface-treating layer.

On the contrary, the surface treatment composition of the present invention contains the PFPE-containing silane compound at the concentration, thereby enabling physical properties (for example, water-repellency, oil-repellency, antifouling property, surface lubricity, and friction durability, in particular, friction durability) of the surface treatment composition to be improved and enabling variations in physical properties of a cured product to be suppressed. The reason for this is considered because the content of the solvent in the surface treatment composition of the present invention is low to thereby hardly cause the contamination due to the solvent and hardly inhibit a formation reaction of the surface-treating layer. Moreover, contamination of an apparatus, due to the solvent, can also be hardly caused, resulting in suppression of the variation in the time taken for removal of the solvent, or a reduction in the time.

A surface treatment composition can be used for formation of a surface-treating layer with spray coating or the like. In such a case, such a surface treatment composition can be diluted with any solvent separately prepared, and then used. In the case where the type of the solvent used in the dilution and the type of a solvent contained in such a surface treatment composition are different, qualities (for example, stability) of such a surface treatment composition after the dilution may be sometimes deteriorated. In the case where the boiling point of the solvent used in the dilution and the boiling point of the solvent contained in such a surface treatment composition are different, such a surface treatment composition after the dilution may have any problem about quality control thereof in spraying or in formation of a surface-treating layer.

On the contrary, the surface treatment composition of the present invention hardly has such a problem because the amount of the solvent contained in the composition is small.

Physical properties (for example, friction durability) of a cured product obtained by using the surface treatment composition of the present invention can be equivalent to physical properties of a cured product obtained by using a composition containing 100% by mass of the PFPE-containing silane compound. The surface treatment composition of the present invention includes the PFPE-containing silane compound at the concentration, thus the composition can be directly applied to a base material, and the base material coated with the composition and a cured product of the composition can be each formed according to a simple method. This is an advantage of the surface treatment composition of the present invention over the composition containing 100% by mass of the PFPE-containing silane compound.

(Other Component)

The surface treatment composition may include other component, in addition to the PFPE-containing silane compound. Such other component is not limited, and examples thereof include a (non-reactive) fluoropolyether compound which can be understood as a fluorine-containing oil, preferably a perfluoro(poly)ether compound (hereinafter, referred to as "fluorine-containing oil"), a (non-reactive) silicone compound (hereinafter, referred to as "silicone oil") which can be understood as a silicone oil, a catalyst, a lower alcohol, a transition metal, a halide ion, a silane coupling agent, and a compound containing an atom having an unshared electron pair in the molecular structure.

The fluorine-containing oil is not limited, and examples thereof include a compound (perfluoro(poly)ether compound) represented by the following general formula (III):

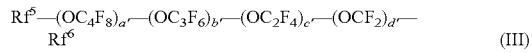

$$Rf^5—(OC_4F_8)_{a'}—(OC_3F_6)_{b'}—(OC_2F_4)_{c'}—(OCF_2)_{d'}—Rf^6 \quad (III)$$

wherein $Rf^5$ represents an alkyl group having 1 to 16 carbon atoms optionally substituted with one or more fluorine atoms (preferably $C_{1-16}$ perfluoroalkyl group), $Rf^6$ represents an alkyl group having 1 to 16 carbon atoms optionally substituted with one or more fluorine atoms (preferably $C_{1-16}$ perfluoroalkyl group), a fluorine atom or a hydrogen atom, and $Rf^5$ and $Rf^6$ are more preferably, each independently, a $C_{1-3}$ perfluoroalkyl group; and a', b', c' and d' represent the respective four numbers of repeating units in perfluoro(poly)ether constituting a main backbone of the polymer and are mutually independently an integer of 0 or more and 300 or less, the sum of a', b', c' and d' is at least 1, preferably 1 to 300, more preferably 20 to 300, the occurrence order of the respective repeating units in parentheses with the subscript a', b', c' or d' is not limited in the formula, and, among such repeating units, —(OC₄F₈)— may be any of —(OCF₂CF₂CF₂CF₂)—, —(OCF(CF₃) CF₂CF₂)—, —(OCF₂CF(CF₃)CF₂)—, —(OCF₂CF₂CF (CF₃))—, —(OC(CF₃)₂CF₂)—, —(OCF₂C(CF₃)₂)—, —(OCF(CF₃)CF(CF₃))—, —(OCF(C₂F₅)CF₂)— and —(OCF₂CF(C₂F₅))—, and is preferably —(OCF₂CF₂CF₂CF₂)—, and —(OC₃F₆)— may be any of —(OCF₂CF₂CF₂)—, —(OCF(CF₃)CF₂)— and —(OCF₂CF (CF₃))—, and is preferably —(OCF₂CF₂CF₂)—, and, for example, —(OC₂F₄)— may be any of —(OCF₂CF₂)— and —(OCF(CF₃))—, and is preferably —(OCF₂CF₂)—.

Examples of the perfluoro(poly)ether compound represented by general formula (III) include a compound represented by any of the following general formulae (IIIa) and (IIIb) (which may be adopted singly or as a mixture of two or more kinds thereof).

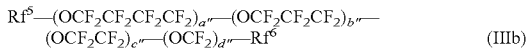

In such formulae, $Rf^5$ and $Rf^6$ are as described above; in formula (IIIa), b" is an integer of 1 or more and 100 or less; in formula (IIIb), a" and b" are each independently an integer of 1 or more and 30 or less, and c" and d" are each independently an integer of 1 or more and 300 or less, and the occurrence order of the respective repeating units in parentheses with subscript a", b", c", d" is not limited in the formulae.

The fluorine-containing oil may have a number average molecular weight of 1,000 to 30,000. In particular, the number average molecular weight of the compound represented by formula (IIIa) is preferably 2,000 to 8,000. In one embodiment, the number average molecular weight of the compound represented by formula (IIIb) is 3,000 to 8,000. In another embodiment, the number average molecular weight of the compound represented by formula (IIIb) is 8,000 to 30,000.

In one embodiment, in the case where the surface-treating layer is formed according to a vacuum deposition method, the average molecular weight of the fluorine-containing oil may be larger than the average molecular weight of the PFPE-containing silane compound (for example, compound represented by formula (A1), (A2), (B1), (B2), (C1), (C2), (D1) or (D2)). Such an average molecular weight enables a surface-treating layer formed by using the PFPE-containing silane compound of the present invention to obtain better friction durability and surface lubricity.

In one embodiment, the average molecular weight of the fluorine-containing oil may be smaller than the average molecular weight of the PFPE-containing silane compound. Such an average molecular weight not only enables a surface-treating layer formed by using the surface treatment composition of the present invention to be inhibited from being reduced in transparency, but also enables a surface-treating layer having high friction durability and high surface lubricity to be formed.

The surface treatment composition can include, for example, 0 to 500 parts by mass, preferably 0 to 100 parts by mass, more preferably 1 to 50 parts by mass, further preferably 1 to 5 parts by mass of the fluorine-containing oil based on 100 parts by mass of the PFPE-containing silane compound.

The fluorine-containing oil may be a compound represented by general formula Rf'—F, wherein Rf' is C5-16 perfluoroalkyl group, from another viewpoint. The fluorine-containing oil may be a chlorotrifluoroethylene oligomer. The compound represented by Rf'—F and the chlorotrifluoroethylene oligomer are preferable in that high affinity with the perfluoro(poly)ether group-containing silane compound where Rf is a $C_{1-16}$ perfluoroalkyl group is obtained.

The fluorine-containing oil contributes to an enhancement in surface lubricity of the surface-treating layer.

The silicone oil can be, for example, a linear or cyclic silicone oil having 2,000 or less siloxane bonds. The linear silicone oil may be any of so-called straight silicone oil and modified silicone oil. Examples of the straight silicone oil include a dimethylsilicone oil, a methylphenylsilicone oil, and a methyl hydrogen silicone oil. Examples of the modified silicone oil include any straight silicone oil modified by alkyl, aralkyl, polyether, higher fatty acid ester, fluoroalkyl, amino, epoxy, carboxyl, alcohol, or the like. Examples of the cyclic silicone oil include a cyclic dimethylsiloxane oil.

The surface treatment composition can include, for example, 0 to 50 parts by mass, preferably 0 to 5 parts by mass of such a silicone oil based on 100 parts by mass of the PFPE-containing silane compound (in the case of two or more kinds, the total thereof, much the same is true on the following).

Such a silicone oil contributes to enhancing surface lubricity of the surface-treating layer.

Examples of the catalyst include acids (for example, acetic acid and trifluoroacetic acid), bases (for example, ammonia, triethylamine and diethylamine), transition metals (for example, Ti, Ni, and Sn), and any metal-based catalyst containing a transition metal.

The catalyst promotes hydrolysis and dehydration condensation of the fluorine-containing silane compound, and promotes formation of the surface-treating layer.

Examples of the lower alcohol as other component described above include an alcohol compound having 1 to 6 carbon atoms.

Examples of the transition metal further include platinum, ruthenium and rhodium.

Examples of the metal-based catalyst containing a transition metal can include tetrapropyl titanate (more specifically, tetraisopropyl titanate (tetraisopropaxy titanium), tetra-n-propyl titanate), tetrapropyl zirconate (more specifically, tetraisopropyl zirconia and tetra-n-propyl zirconate).

Examples of the halide ion include a chloride ion.

Examples of the silane coupling agent include tetraethoxysilane, methyltrimethoxysilane, 3-aminopropyltrimethoxysilane, 3-glycidoxypropyltrimethoxysilane and methyltriacetoxysilane.

Examples of the compound containing an atom having an unshared electron pair in the molecular structure include diethylamine, triethylamine, aniline, pyridine, hexamethylphosphoramide, N,N-diethylacetamide, N,N-diethylformamide, N,N-dimethylacetamide, N-methylformamide, N,N-dimethylformamide, N-methylpyrrolidone, tetramethylurea, dimethyl sulfoxide (DMSO), tetramethylene sulfoxide, methylphenyl sulfoxide and diphenyl sulfoxide. Among such compounds, dimethyl sulfoxide or tetramethylene sulfoxide is preferably used.

In one embodiment, the surface treatment composition does not include, as such other component, any fluorine-containing oil, silicone oil, catalyst, lower alcohol, transition metal, halide ion, and compound containing an atom having an unshared electron pair in a molecular structure.

The surface treatment composition can be formed into a pellet by impregnating a porous material, for example, a porous ceramic material or a metal fiber, for example, that obtained by floccing a steel wool, therewith. The pellet can be used in, for example, vacuum deposition.

The surface treatment composition of the present invention can impart water-repellency, oil-repellency, antifouling property, waterproof property, high friction durability and UV resistance to the base material, and thus is suitably used as a surface treatment composition. Specifically, the surface treatment composition of the present invention may be suitably used as an antifouling coating agent or a waterproof coating agent, without any limitation.

(Article)

Next, the article of the present invention is described.

The article of the present invention includes a base material, and a layer (surface-treating layer) formed by the surface treatment composition of the present invention, on the surface of the base material. The article can be produced as follows, for example.

First, the base material is prepared. The base material which can be used in the present invention can be any suitable material such as glass, a resin (which may be a natural or synthetic resin, for example, a common plastic material, and may be in the form of a plate, a film, or the like), a metal (which may be a single substance of a metal such as aluminum, copper or iron, or a composite such as an alloy thereof), ceramics, a semiconductor (silicon, germanium, or the like), a fiber (woven cloth, unwoven cloth, or the like), fur, leather, a wood material, china and porcelain, a stone material, or a building material.

The glass is preferably sapphire glass, soda-lime glass, alkali aluminosilicate glass, borosilicate glass, alkali-free glass, crystal glass, or quartz glass, particularly preferably chemically strengthened soda-lime glass, chemically strengthened alkali aluminosilicate glass, and chemically bonded borosilicate glass.

The resin is preferably an acrylic resin or polycarbonate.

For example, in the case where an article to be produced is an optical member, the material constituting the surface of the base material may be a material for an optical member, for example, glass or transparent plastic. In the case where an article to be produced is an optical member, any layer (or film), for example, a hard coating layer or an antireflection layer may be formed on the surface (outermost layer) of the base material. Any of a monolayer antireflection layer and a multilayer antireflection layer may be used for the antireflection layer. Examples of an inorganic substance which can be used in the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. Such an inorganic substance may be used singly or in combinations (for example as a mixture) of two or more kinds thereof. In the case where a multilayer antireflection layer is intended, $SiO_2$ and/or $SiO$ are/is preferably used in the outermost layer. In the case where an article to be produced is an optical glass component for a touch panel, the article may include a transparent electrode, for example, a thin film with indium tin oxide (ITO), indium zinc oxide or the like, on a portion of the surface of the base material (glass). For example, the base material may have an insulating layer, an adhesive layer, a protecting layer, a decorated frame layer (I-CON), an atomized film layer, a hard coating layer, a polarizing film, a phase difference film, a liquid crystal display module, and the like depending on a particular specification or the like thereof.

The shape of the base material is not limited. A surface area of the base material, on which the surface-treating layer is to be formed, may be at least one portion of the surface of the base material, and can be appropriately determined depending on the application, a particular specification or the like of an article to be produced.

Such a base material may include any material originally having a hydroxyl group at least on a surface portion thereof. Examples of such any material include glass, as well as a metal (in particular, base metal), ceramics and a semiconductor, where a natural oxidized film or a thermal oxidized film is to be formed on the surface. Alternatively, when the base material has a hydroxyl group but insufficiently or when the base material originally does not have any hydroxyl group, as in a resin and the like, the base material can be subjected to any pre-treatment to thereby introduce or increase a hydroxyl group onto the surface of the base material. Examples of such pre-treatment include a plasma treatment (for example, corona discharge) and ion beam irradiation. Such a plasma treatment can be suitably utilized to not only introduce or increase a hydroxyl group onto the surface of the base material, but also clean the surface of the base material (remove foreign substances and the like). Another example of such a pre-treatment includes a method involving forming an interface adsorbent having a carbon-carbon unsaturated bonding group, in the form of a monomolecular film, on the surface of the base material in advance according to a LB method (Langmuir-Blodgett method), a chemical adsorption method, or the like, and thereafter cleaving an unsaturated bond under an atmosphere containing oxygen, nitrogen, and the like.

Alternatively, the base material may include, at least on a surface portion thereof, a silicone compound having at least another reactive group, such as a Si—H group, or a material including alkoxysilane.

Next, the layer of the surface treatment composition of the present invention is formed on the surface of the base material, and the layer is, if necessary, subjected to a post-treatment, thereby allowing a surface-treating layer to be formed from the surface treatment composition of the present invention.

The layer of the surface treatment composition of the present invention can be formed by applying the surface treatment composition of the present invention to the surface of the base material so that the surface is coated. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, chemical deposition (CVD), and similar methods. Specific examples of the deposition method (usually, vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating according to an atmospheric pressure plasma method can also be made.

The layer is preferably formed so that the surface treatment composition of the present invention coexists with a catalyst for hydrolysis and dehydration condensation, in the layer. Simply, in the case of the wet coating method, the surface treatment composition of the present invention may be diluted with a solvent and the catalyst may be then added to a diluted solution of the surface treatment composition of the present invention immediately before the diluted solution is applied onto the surface of the base material. In the case of the dry coating method, the surface treatment composition of the present invention, to which the catalyst is added, may be subjected to a deposition (usually, vacuum deposition) treatment as it is, or a pellet-like substance obtained by impregnating a porous body of a metal such as iron or copper with the surface treatment composition of the present invention, to which the catalyst is added, may be subjected to a deposition (usually, vacuum deposition) treatment.

Any appropriate acid or base can be used in the catalyst. Such an acid catalyst can be, for example, acetic acid, formic acid or trifluoroacetic acid. Such a base catalyst can be, for example, ammonia or any organic amine.

Next, the film is, if necessary, subjected to a post-treatment. The post-treatment is not limited, and, for example, may be made by sequentially or simultaneously performing water feeding and dry heating.

After the layer of the surface treatment composition of the present invention is formed on the surface of the base material, as described above, water is fed to the layer (hereinafter, also referred to as "precursor layer"). The water feeding method is not limited, and, for example, a method with dew condensation due to the difference in temperature between the precursor layer (and base material) and an ambient atmosphere, or blowing of water vapor (steam) may be used.

Such water feeding can be performed under an atmosphere of, for example, 0 to 250° C., preferably 60° C. or more, further preferably 100° C. or more, and preferably 180° C. or less, further preferably 150° C. or less. Such water feeding can be made in such a temperature range, thereby allowing hydrolysis to progress. The pressure here is not limited, and can be simply atmospheric pressure.

Next, the precursor layer is heated on the surface of the base material under a dry atmosphere at more than 60° C. The dry heating method is not limited, and the precursor layer may be disposed, together with the base material, under an atmosphere of a temperature of more than 60° C., preferably more than 100° C., and, for example, 250° C. or less, preferably 180° C. or less, and an unsaturated water vapor pressure. The pressure here is not limited, and can be simply atmospheric pressure.

Such an atmosphere allows groups bonding to Si after hydrolysis, of the PFPE-containing silane compound, to undergo rapid dehydration condensation. Such a group bonding to Si after hydrolysis, of the compound, and a reactive group present on the surface of the base material are rapidly reacted between the compound and the base material, and dehydration condensation is made in the case where the reactive group present on the surface of the base material is a hydroxyl group. As a result, a bond is formed between the perfluoro(poly)ether group-containing silane compound and the base material.

The water feeding and dry heating may be continuously performed by using superheated steam.

The post-treatment can be performed as described above. While such a post-treatment can be performed in order to further enhance friction durability, it is noted that such a post-treatment is not essential for producing the article. For example, the surface treatment composition of the present invention may be applied to the surface of the base material and thereafter only left to still stand as it is.

The article is produced by forming a layer derived from a film of the surface treatment composition of the present invention on the surface of the base material, as described above. The layer thus obtained, derived from the surface treatment composition, has favorable UV resistance. The layer can also have not only favorable UV resistance, but also water-repellency, oil-repellency, antifouling property (for example, preventing fouling such as fingerprints from adhering), surface lubricity (or lubricity, for example, wiping property of fouling such as fingerprints, and excellent texture to fingers), high friction durability, chemical resistance, and the like, depending on the compositional feature of a composition to be used, and can be suitably utilized as a functional thin film.

That is, the present inventive surface treatment composition can also be further used for formation of an optical material having the cured product on the outermost layer. Examples of the optical material preferably include not only optical materials with respect to displays exemplified below, but also a variety of optical materials: such as cathode ray tubes (CRTs; for example, TV and a personal computer monitor), displays such as a liquid crystal display, a plasma display, an organic EL display, an inorganic thin-film EL dot matrix display, a rear projection display, a vacuum fluorescent display (VFD) and a field emission display (FED; Field Emission Display), or protective plates for such displays or such protective plates whose surfaces are each subjected to an antireflection film treatment.

The article including the surface treatment composition obtained by the present invention is not limited, and can be an optical member. Examples of such an optical member include the following: lenses for eyeglasses; a front surface protective plate, an antireflection plate, a polarizing plate or an anti-glare plate for displays such as PDP and LCD; a touch panel sheet for devices such as a mobile phone and a handheld terminal; disk surfaces of optical disks such as a Blu-ray (Blu-ray®) disk, a DVD disk, CD-R and MO; and an optical fiber.

The article including the surface-treating layer obtained by the present invention may be medical equipment or a medical material.

The thickness of the layer of the surface treatment composition is not limited. In the case of an optical member, the thickness of the layer is in the range from 1 to 50 nm, more preferably 1 to 30 nm, particularly preferably 1 to 15 nm in terms of optical performance, surface lubricity, friction durability and antifouling property.

Another mode may involve forming a separate layer on the surface of the base material and thereafter forming a surface-treating layer obtained by the present invention, on the surface of the layer.

The article obtained by using the surface treatment composition of the present invention is described above. Herein, the application and the usage method of the surface treatment composition, the method for producing the article, and the like, of the present invention, are not limited to those exemplified above.

EXAMPLES

The present invention is more specifically described with reference to the following Examples, but the present invention is not intended to be limited to such Examples. In the present Examples, the occurrence order of the repeating units constituting perfluoro(poly)ether is not limited.

Example A-1

The following fluorine-containing silane compound was prepared by Novec HFE7200 so that the solid concentration was 40% by mass, thereby preparing a surface treatment composition. Herein, the solid concentration means % by mass relative to the entire composition. The content of water in Novec HFE7200, as determined according to a Karl Fischer method, was 47 ppm.

Fluorine-Containing Silane Compound

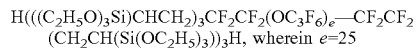

$H(((C_2H_5O)_3Si)CHCH_2)_3CF_2CF_2(OC_3F_6)_e$—$CF_2CF_2(CH_2CH(Si(OC_2H_5)_3))_3H$, wherein $e=25$ Examples A-2 to A-4

Each surface treatment composition was prepared in the same manner as in Example A-1 except that the solid concentration was any concentration described in Table 1.

Comparative Example A-1

A composition was prepared in the same manner as in Example A-1 except that the solid concentration was any concentration described in Table 1.

Comparative Example A-2

A composition was prepared in the same manner as in Example A-1 except that no solvent was used (namely, the solid concentration was 100% by mass).

Formation of Cured Product

Each of the compositions obtained in Examples and Comparative Examples was vacuum-deposited on chemically strengthened glass ("Gorilla" glass manufactured by Corning Incorporated, thickness: 0.7 mm). The treatment condition of such vacuum deposition included a pressure of $3.0 \times 10^3$ Pa, and a 7 mm silicon dioxide film was formed on the surface of the chemically strengthened glass.

Subsequently, 2 mg (solid content) of such each composition per chemically strengthened glass (55 mm×100 mm) was deposited by resistive heating on the chemically strengthened glass on which the silicon dioxide film was formed. An objective degree of vacuum was here set to a pressure of $3.0 \times 10^3$ Pa, and the time until such an objective degree of vacuum was achieved was measured. The results are shown in Table 1.

Thereafter, such chemically strengthened glass provided with a deposited film was left to still stand under an atmosphere of a temperature of 20° C. and a humidity of 65% for 24 hours. Herein, the formation of a cured product was performed five times with respect to each Example and each Comparative Example, and the number of samples was 1 to 5 as described in Table 1.

Evaluation of Friction Durability

The friction durability of the cured product formed as above was evaluated as follows.

First, the static contact angle of water was measured in terms of the initial evaluation, in the state where the surface of the cured layer formed was not still contacted with any object (the number of frictions: zero).

First, the static contact angle of water was measured in terms of the initial evaluation, in the state where the surface of the cured layer formed was not still contacted with any object (the number of frictions: zero). Thereafter, a steel wool friction durability evaluation was performed as friction durability evaluation. Specifically, a base agent was horizontally disposed, a steel wool (thread size #0000, dimension: 5 mm×10 mm×10 mm) was brought into contact with the upper surface exposed of the cured layer, a load of 1,000 gf was applied thereonto, and thereafter the steel wool to which such a load was applied was allowed to reciprocate at a speed of 140 mm/sec. The static contact angle (degrees) of water was measured per 1000 shuttling (100 in Comparative Example 2), and the evaluation was stopped when the measurement value of the contact angle reached less than 100 degrees. The number of frictions, at which recording as 100 degrees was finally made, was shown in Table 1.

The static contact angle of water was here a value obtained by measurement with 1 μL of water at 25° C. by using a contact angle measurement apparatus (manufactured by Kyowa Interface Science, Inc.).

TABLE 1

| (Number of samples) | Solid concentration [% by mass] | Time until achievement of objective degree of vacuum [minutes] | Steel wool friction durability [cycles] |
|---|---|---|---|
| Example A-1   1 | 40% | 17 | 7000 |
| 2 | | 25 | 4000 |
| 3 | | 19 | 6000 |
| 4 | | 21 | 5000 |
| 5 | | 17 | 6000 |
| Example A-2   1 | 50% | 17 | 6000 |
| 2 | | 17 | 7000 |
| 3 | | 18 | 7000 |
| 4 | | 18 | 6000 |
| 5 | | 19 | 5000 |
| Example A-3   1 | 60% | 17 | 7000 |
| 2 | | 18 | 8000 |
| 3 | | 18 | 7000 |
| 4 | | 17 | 6000 |
| 5 | | 17 | 6000 |
| Example A-4   1 | 80% | 17 | 7000 |
| 2 | | 16 | 6000 |
| 3 | | 17 | 6000 |
| 4 | | 18 | 7000 |
| 5 | | 18 | 8000 |
| Comparative Example A-1   1 | 20% | 22 | 5000 |
| 2 | | 19 | 6000 |
| 3 | | 34 | 2000 |
| 4 | | 40 | 1000 |
| 5 | | 36 | 2000 |
| Comparative Example A-2   1 | 100% | 17 | 7000 |
| 2 | | 17 | 7000 |
| 3 | | 18 | 6000 |
| 4 | | 17 | 7000 |
| 5 | | 18 | 6000 |

Example B-1

A surface treatment composition was prepared which included the following PFPE-containing silane compound, cross-linking agent, catalyst and solvent and which had a solid concentration of 50% by mass. Hereinafter, the solid concentration refers to a mass ratio of the PFPE-containing silane compound, the cross-linking agent and the catalyst to the surface treatment composition.

PFPE-Containing Silane Compound:

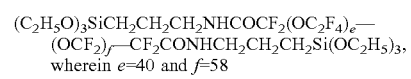

wherein $e=40$ and $f=58$

Cross-linking agent: tetraethoxysilane (TEOS) (10% by mass relative to the PFPE-containing silane compound)

Catalyst: tetraisopropaxy titanium (0.09% by mass relative to the PFPE-containing silane compound)

Solvent: Novec HFE7200 (the content of water in Novec HFE7200, determined according to a Karl Fischer method, was 47 ppm)

Example B-2

A surface treatment composition was prepared in the same manner as in Example B-1 except that the solid concentration was 80% by mass.

Comparative Example B-1

A composition was prepared in the same manner as in Example B-1 except that no solvent was used (namely, the solid concentration was 100% by mass).

A glass plate was spray-coated with each of the surface treatment compositions obtained in Examples B-1 and B-2. Thereafter, the resultant was left to still stand under an atmosphere of 25° C. and a humidity of 65% for 24 hours, thereby forming a cured product. The composition of Comparative Example B-1 had a high viscosity and could not be sprayed.

The thickness of the resulting cured product was measured with a laser microscope (Model No.: VK9710, manufactured by Keyence Corporation). The results are shown in Table 2. Respective numbers in "Thickness" in Table 2 here represent the minimum value and the maximum value measured. The description "Uniform" in Table 2 represents a state where a continuous film was formed without any area not coated, like a pinhole. Specifically, an image obtained by a laser microscope was visually confirmed, and any portion where a glass surface was exposed was determined as having a pinhole.

TABLE 2

| | Solid concentration (% by mass) | Thickness (μm) | State of film |
|---|---|---|---|
| Example B-1 | 50 | 30-43 | Uniform |
| Example B-2 | 80 | 45-102 | Uniform |
| Comparative Example B-1 | 100 | (Failure to form) | — |

INDUSTRIAL APPLICABILITY

The present invention can be suitably utilized for forming a fluorine-containing sealant for embedding any void (for example, a void at a display edge) between electronic members such as a display and a printed board in electronic equipment.

The present invention includes following embodiments:

Embodiment 1. A surface treatment composition comprising a perfluoropolyether group-containing silane compound and a solvent, wherein a proportion of the perfluoropolyether group-containing silane compound based on 100 parts by mass of a total amount of the perfluoropolyether group-containing silane compound and the solvent is in the range from 30 to 99 parts by mass.

Embodiment 2. The surface treatment composition according to Embodiment 1, wherein the proportion of the perfluoropolyether group-containing silane compound based on 100 parts by mass of a total amount of the perfluoropolyether group-containing silane compound and the solvent is more than 50 parts by mass.

Embodiment 3. The surface treatment composition according to Embodiment 1 or 2, wherein the solvent is a fluorine atom-containing solvent.

Embodiment 4. The surface treatment composition according to Embodiment 3, wherein a content of water contained in the solvent is 100 ppm by mass or less.

Embodiment 5. The surface treatment composition according to any one of Embodiments 1 to 4, having a viscosity in the range from 10 to 1000 mPa·s.

Embodiment 6. The surface treatment composition according to any one of Embodiments 1 to 5, wherein the perfluoropolyether group-containing silane compound is at least one perfluoropolyether group-containing silane compound represented by formula (A1), (A2), (B1), (B2), (C1), (C2), (D1) or (D2):

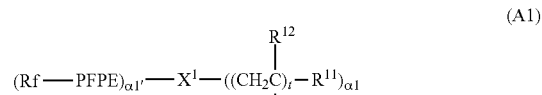

(A1)

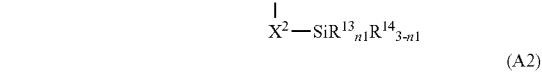

(A2)

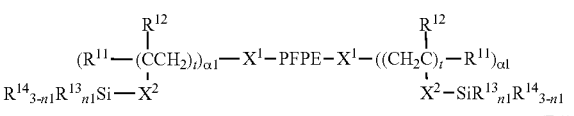

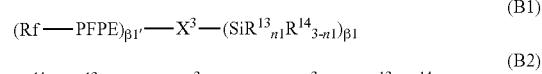

(B1)

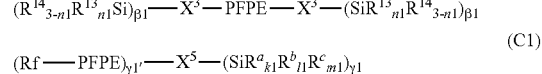

(B2)

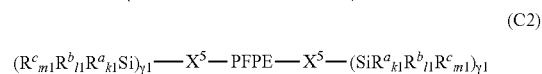

(C1)

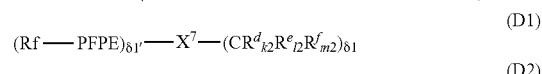

(C2)

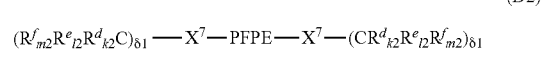

(D1)

(D2)

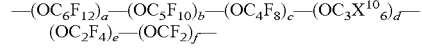

wherein:
each PFPE, at each occurrence, is independently a group represented by formula:

—(OC$_6$F$_{12}$)$_a$—(OC$_5$F$_{10}$)$_b$—(OC$_4$F$_8$)$_c$—(OC$_3$X$^{10}$$_6$)$_d$—(OC$_2$F$_4$)$_e$—(OCF$_2$)$_f$— wherein a, b, c, d, e and f are each independently an integer of 0 or more and 200 or less, the sum of a, b, c, d, e and f is at least 1, the occurrence order of the respective repeating units in parentheses with a, b, c, d, e or f is not limited in the formula, and each X$^{10}$, at each occurrence, independently is a hydrogen atom, a fluorine atom or a chlorine atom;

each Rf, at each occurrence, independently represents an alkyl group having 1 to carbon atoms, optionally substituted with one or more fluorine atoms;

each R$^{13}$, at each occurrence, independently represents a hydroxyl group or a hydrolyzable group;

each R$^{14}$, at each occurrence, independently represents a hydrogen atom or an alkyl group having 1 to 22 carbon atoms;

each R$^{11}$, at each occurrence, independently represents a hydrogen atom or a halogen atom;

each R$^{12}$, at each occurrence, independently represents a hydrogen atom or a lower alkyl group;

n1 with respect to each (—SiR$^{13}$$_{n1}$R$^{14}$$_{3-n1}$) unit is independently an integer of 0 to 3;

provided that at least one n1 in formulae (A1), (A2), (B1) and (B2) is an integer of 1 to 3;

each X$^1$, at each occurrence, independently represents a single bond or a di- to decavalent organic group;

each X$^2$, at each occurrence, independently represents a single bond or a divalent organic group;

each t, at each occurrence, is independently an integer of 1 to 10;

each α1, at each occurrence, is independently an integer of 1 to 9;

each α1' is independently an integer of 1 to 9;

each $X^3$, at each occurrence, independently represents a single bond or a di- to decavalent organic group;
each β1, at each occurrence, is independently an integer of 1 to 9;
each β1' is independently an integer of 1 to 9;
each $X^5$, at each occurrence, independently represents a single bond or a di- to decavalent organic group;
each γ1, at each occurrence, is independently an integer of 1 to 9;
each γ1' is independently an integer of 1 to 9;
each $R^a$, at each occurrence, independently represents —$Z^3$—$SiR^{71}_{p1}R^{72}_{q1}R^{73}_{r1}$;
each $Z^3$, at each occurrence, independently represents an oxygen atom or a divalent organic group;
each $R^{71}$, at each occurrence, independently represents $R^{a'}$;
$R^{a'}$ has the same meaning as $R^a$;
the number of Si linearly linked via a $Z^3$ group in $R^a$ is at most 5;
each $R^{72}$, at each occurrence, independently represents a hydroxyl group or a hydrolyzable group;
each $R^{73}$, at each occurrence, independently represents a hydrogen atom or a lower alkyl group;
each p1, at each occurrence, is independently an integer of 0 to 3;
each q1, at each occurrence, is independently an integer of 0 to 3;
each r1, at each occurrence, is independently an integer of 0 to 3;
provided that the sum of p1, q1 and r1 with respect to (—$Z^3$—$SiR^{71}_{p1}R^{72}_{q1}R^{73}_{r1}$) is 3 and at least one q1 in formulae (C1) and (C2) is an integer of 1 to 3;
each $R^b$, at each occurrence, independently represents a hydroxyl group or a hydrolyzable group;
each $R^c$, at each occurrence, independently represents a hydrogen atom or a lower alkyl group;
each k1, at each occurrence, is independently an integer of 0 to 3;
each l1, at each occurrence, is independently an integer of 0 to 3;
each m1, at each occurrence, is independently an integer of 0 to 3;
provided that the sum of k1, l1 and m1 with respect to ($SiR^a_{k1}R^b_{l1}R^c_{m1}$) is 3;
each $X^7$ independently represents a single bond or a di- to decavalent organic group;
each δ1 is independently an integer of 1 to 9;
each δ1' is independently an integer of 1 to 9;
each $R^d$, at each occurrence, independently represents —$Z^4$—$CR^{81}_{p2}R^{82}_{q2}R^{83}_{r2}$;
each $Z^4$, at each occurrence, independently represents an oxygen atom or a divalent organic group;
each $R^{81}$, at each occurrence, independently represents $R^{d'}$;
$R^{d'}$ has the same meaning as $R^d$;
the number of C linearly bonded via a $Z^4$ group in $R^d$ is at most 5;
each $R^{82}$, at each occurrence, independently represents —Y—$SiR^{85}_{n2}R^{86}_{3-n2}$;
each Y, at each occurrence, independently represents a divalent organic group;
each $R^{85}$, at each occurrence, independently represents a hydroxyl group or a hydrolyzable group;
each $R^{86}$, at each occurrence, independently represents a hydrogen atom or a lower alkyl group;
n2 with respect to a (—Y—$SiR^{85}_{n2}R^{86}_{3-n2}$) unit independently represents an integer of to 3;
each $R^{83}$, at each occurrence, independently represents a hydrogen atom, a hydroxyl group or a lower alkyl group;
each p2, at each occurrence, is independently an integer of 0 to 3;
each q2, at each occurrence, is independently an integer of 0 to 3;
each r2, at each occurrence, is independently an integer of 0 to 3;
provided that the sum of p2, q2 and r2 with respect to (—$Z^4$—$CR^{81}_{p2}R^{82}_{q2}R^{83}_{r2}$) is 3;
each $R^e$, at each occurrence, independently represents —Y—$SiR^{85}_{n2}R^{86}_{3-n2}$;
each $R^f$, at each occurrence, independently represents a hydrogen atom, a hydroxyl group or a lower alkyl group;
each k2, at each occurrence, is independently an integer of 0 to 3;
each l2, at each occurrence, is independently an integer of 0 to 3; and
each m2, at each occurrence, is independently an integer of 0 to 3;
provided that the sum of k2, l2 and m2 with respect to ($CR^d_{k2}R^e_{l2}R^f_{m2}$) is 3 and two or more groups represented by —Y—$SiR^{85}_{n2}R^{86}_{3-n2}$ wherein n2 is 1 or more are present in formulae (D1) and (D2).

Embodiment 7. The surface treatment composition according to Embodiment 6, wherein $X^{10}$ is a fluorine atom.

Embodiment 8. The surface treatment composition according to any one of Embodiments 1 to 7, further comprising one or more other components selected from a fluorine-containing oil, a silicone oil, an alcohol, a catalyst, a transition metal, a halide ion, a silane coupling agent, and a compound containing an atom having an unshared electron pair in a molecular structure.

Embodiment 9. The surface treatment composition according to any one of Embodiments 1 to 8, wherein the composition is used as an antifouling coating agent or a water-proof coating agent.

Embodiment 10. The surface treatment composition according to any one of Embodiments 1 to 9, for vacuum deposition.

Embodiment 11. A pellet comprising the surface treatment composition according to any one of Embodiments 1 to 10.

Embodiment 12. An article comprising a base material, and a layer formed from the surface treatment composition according to any one of Embodiments 1 to 10, on a surface of the base material.

Embodiment 13. The article according to Embodiment 12, wherein the article is an optical member.

The invention claimed is:
1. A surface treatment composition comprising a perfluoropolyether group-containing silane compound and a solvent, wherein
a proportion of the perfluoropolyether group-containing silane compound based on 100 parts by mass of a total amount of the perfluoropolyether group-containing silane compound and the solvent is in the range from 60 parts by mass to 99 parts by mass;
the perfluoropolyether group-containing silane compound is at least one perfluoropolyether group-containing silane compound represented by formula (A1), (A2), (C1), (C2), (D1) or (D2):

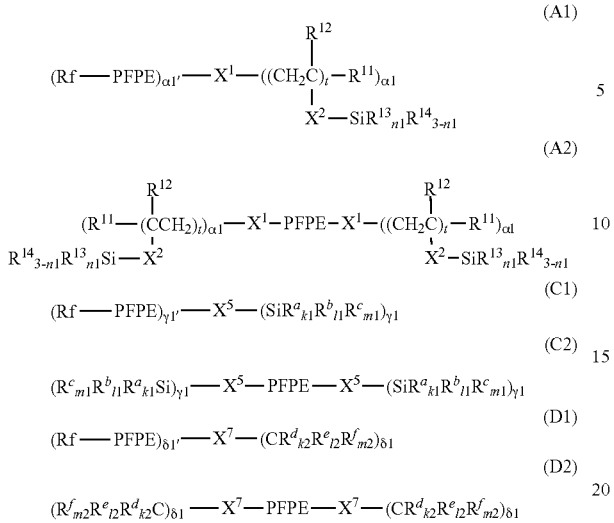

(A1), (A2), (C1), (C2), (D1), (D2)

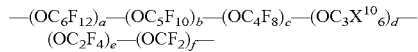

wherein:

each PFPE, at each occurrence, is independently a group represented by formula:

$$-(OC_6F_{12})_a-(OC_5F_{10})_b-(OC_4F_8)_c-(OC_3X^{10}_6)_d-(OC_2F_4)_e-(OCF_2)_f-$$

wherein a, b, c, d, e and f are each independently an integer of 0 or more and 200 or less, the sum of a, b, c, d, e and f is at least 1, the occurrence order of the respective repeating units in parentheses with a, b, c, d, e or f is not limited in the formula, and each $X^{10}$, at each occurrence, independently is a hydrogen atom, a fluorine atom or a chlorine atom;

each Rf, at each occurrence, independently represents an alkyl group having 1 to 16 carbon atoms, optionally substituted with one or more fluorine atoms;

each $R^{13}$, at each occurrence, independently represents a hydroxyl group or a hydrolyzable group;

each $R^{14}$, at each occurrence, independently represents a hydrogen atom or an alkyl group having 1 to 22 carbon atoms;

each $R^{11}$, at each occurrence, independently represents a hydrogen atom or a halogen atom;

each $R^{12}$, at each occurrence, independently represents a hydrogen atom or a lower alkyl group;

n1 with respect to each $(-SiR^{13}_{n1}R^{14}_{3-n1})$ unit is independently an integer of 0 to 3;

each $X^1$, at each occurrence, independently represents a single bond or a di- to decavalent organic group;

each $X^2$, at each occurrence, independently represents a single bond or a divalent organic group;

each t, at each occurrence, is independently an integer of 2 to 10;

each α1, at each occurrence, is independently an integer of 1 to 9;

each α1' is independently an integer of 1 to 9;

each $X^5$, at each occurrence, independently represents a single bond or a di- to decavalent organic group;

each γ1, at each occurrence, is independently an integer of 1 to 9;

each γ1' is independently an integer of 1 to 9;

each $R^a$, at each occurrence, independently represents $-Z^3-SiR^{71}_{p1}R^{72}_{q1}R^{73}_{r1}$;

each $Z^3$, at each occurrence, independently represents a divalent organic group, and does not contain a siloxane bond;

each $R^{71}$, at each occurrence, independently represents $R^{a'}$;

$R^{a'}$ has the same meaning as $R^a$;

the number of Si linearly linked via a $Z^3$ group in $R^a$ is at most 5;

each $R^{72}$, at each occurrence, independently represents a hydroxyl group or a hydrolyzable group;

each $R^{73}$, at each occurrence, independently represents a hydrogen atom or a lower alkyl group;

each p1, at each occurrence, is independently an integer of 0 to 2;

each q1, at each occurrence, is independently an integer of 1 to 3;

each r1, at each occurrence, is independently an integer of 0 to 2;

provided that the sum of p1, q1 and r1 with respect to $(-Z^3-SiR^{71}_{p1}R^{72}_{q1}R^{73}_{r1})$ is 3;

each $R^b$, at each occurrence, independently represents a hydroxyl group or a hydrolyzable group;

each $R^c$, at each occurrence, independently represents a hydrogen atom or a lower alkyl group;

k1 is 3;

l1 and m1 are 0;

each $X^7$ independently represents a single bond or a di- to decavalent organic group;

each δ1 is independently an integer of 1 to 9;

each δ1' is independently an integer of 1 to 9;

each $R^d$, at each occurrence, independently represents $-Z_4-CR^{81}_{p2}R^{82}_{q2}R^{83}_{r2}$;

each $Z^4$, at each occurrence, independently represents an oxygen atom or a divalent organic group;

each $R^{81}$, at each occurrence, independently represents $R^{d'}$;

$R^{d'}$ has the same meaning as $R^d$;

the number of C linearly bonded via a $Z^4$ group in $R^d$ is at most 5;

each $R^{82}$, at each occurrence, independently represents $-Y-SiR^{85}_{n2}R^{86}_{3-n2}$;

each Y, at each occurrence, independently represents a divalent organic group;

each $R^{85}$, at each occurrence, independently represents a hydroxyl group or a hydrolyzable group;

each $R^{86}$, at each occurrence, independently represents a hydrogen atom or a lower alkyl group;

n2 with respect to a $(-Y-SiR^{85}_{n2}R^{86}_{3-n2})$ unit independently represents an integer of 1 to 3;

each $R^{83}$, at each occurrence, independently represents a hydrogen atom, a hydroxyl group or a lower alkyl group;

each p2, at each occurrence, is independently an integer of 0 to 3;

each q2, at each occurrence, is independently an integer of 0 to 3;

each r2, at each occurrence, is independently an integer of 0 to 3;

provided that the sum of p2, q2 and r2 with respect to $(-Z^4-CR^{81}_{p2}R^{82}_{q2}R^{83}_{r2})$ is 3;

each $R^e$, at each occurrence, independently represents $-Y-SiR^{85}_{n2}R^{86}_{3-n2}$;

each $R^f$, at each occurrence, independently represents a hydrogen atom, a hydroxyl group or a lower alkyl group;

each k2, at each occurrence, is independently 0 or 1;

each l2, at each occurrence, is independently 2 or 3; and each m2, at each occurrence, is independently 0 or 1; provided that the sum of k2, l2 and m2 with respect to $(CR^d_{k2}R^e_{l2}R^f_{m2})$ is 3.

2. The surface treatment composition according to claim 1, wherein the solvent is a fluorine atom-containing solvent.

3. The surface treatment composition according to claim 2, wherein a content of water contained in the solvent is 100 ppm by mass or less.

4. The surface treatment composition according to claim 1, having a viscosity in the range from 10 to 1000 mPa·s.

5. The surface treatment composition according to claim 1, wherein $X^{10}$ is a fluorine atom.

6. The surface treatment composition according to claim 1, further comprising one or more other components selected from a fluorine-containing oil, a silicone oil, an alcohol, a catalyst, a transition metal, a halide ion, a silane coupling agent, and a compound containing an atom having an unshared electron pair in a molecular structure.

7. The surface treatment composition according to claim 1, wherein the composition is used as an antifouling coating agent or a water-proof coating agent.

8. The surface treatment composition according to claim 1, for vacuum deposition.

9. A pellet comprising the surface treatment composition according to claim 1.

10. An article comprising a base material, and a layer formed from the surface treatment composition according to claim 1, on a surface of the base material.

11. The article according to claim 10, wherein the article is an optical member.

* * * * *